(12) United States Patent
Stokes et al.

(10) Patent No.: US 11,385,348 B2
(45) Date of Patent: Jul. 12, 2022

(54) WIDEBAND SONAR RECEIVER AND SONAR SIGNAL PROCESSING ALGORITHMS

(71) Applicant: FLIR SYSTEMS, INC., Wilsonville, OR (US)

(72) Inventors: Paul Stokes, Fleet (GB); Phil Webb, Hampshire (GB)

(73) Assignee: Teledyne FLIR, LLC, Thousand Oaks, CA (US)

( * ) Notice: Subject to any disclaimer, the term of this patent is extended or adjusted under 35 U.S.C. 154(b) by 474 days.

(21) Appl. No.: 16/457,764

(22) Filed: Jun. 28, 2019

(65) Prior Publication Data

US 2020/0011991 A1 Jan. 9, 2020

Related U.S. Application Data

(63) Continuation of application No. 15/287,652, filed on Oct. 6, 2016, now Pat. No. 10,338,217, which is a
(Continued)

(51) Int. Cl.
*G01S 15/36* (2006.01)
*G01S 15/96* (2006.01)
(Continued)

(52) U.S. Cl.
CPC .............. *G01S 15/36* (2013.01); *G01S 7/52* (2013.01); *G01S 7/52001* (2013.01); *G01S 7/526* (2013.01); *G01S 7/527* (2013.01); *G01S 7/5273* (2013.01); *G01S 7/5276* (2013.01); *G01S 15/02* (2013.01); *G01S 15/104* (2013.01); *G01S 15/105* (2013.01); *G01S 15/108* (2013.01); *G01S 15/14* (2013.01); *G01S 15/50* (2013.01); *G01S 15/582* (2013.01); *G01S 15/96* (2013.01)

(58) Field of Classification Search
CPC ........ G01S 15/36; G01S 7/52; G01S 7/52001; G01S 7/526; G01S 7/527; G01S 7/5273; G01S 7/5276; G01S 15/02; G01S 15/104; G01S 15/105; G01S 15/108; G01S 15/14; G01S 15/50; G01S 15/582; G01S 15/96
See application file for complete search history.

(56) References Cited

U.S. PATENT DOCUMENTS 3,680,105 A 7/1972 Goldstone
3,931,549 A 1/1976 Berns et al.
(Continued)

FOREIGN PATENT DOCUMENTS

CN 204495996 U * 7/2015 ............. G01S 15/50
DE 4117849 12/1992
(Continued)

*Primary Examiner* — Daniel Pihulic
(74) *Attorney, Agent, or Firm* — Haynes and Boone, LLP

(57) ABSTRACT

A wideband sonar receiver is provided that includes: a selectable bandpass filter adapted to filter a received sonar signal to produce a filtered signal and a correlator adapted to correlate the baseband samples with baseband replica samples to provide a correlated signal. In addition, the wideband sonar receiver may include a shaping filter to shape unshaped received pulses. Finally, a variety of sonar processing algorithms are described with regard to reducing clutter and interference, target detection, and bottom detection.

20 Claims, 21 Drawing Sheets

Related U.S. Application Data continuation of application No. 14/261,316, filed on Apr. 24, 2014, now Pat. No. 9,470,779, which is a continuation of application No. PCT/US2012/062315, filed on Oct. 26, 2012.

(60) Provisional application No. 61/607,435, filed on Mar. 6, 2012, provisional application No. 61/551,890, filed on Oct. 26, 2011, provisional application No. 61/551,875, filed on Oct. 26, 2011.

(51) Int. Cl.
  *G01S 7/526* (2006.01)
  *G01S 15/58* (2006.01)
  *G01S 15/50* (2006.01)
  *G01S 7/527* (2006.01)
  *G01S 7/52* (2006.01)
  *G01S 15/14* (2006.01)
  *G01S 15/02* (2006.01)
  *G01S 15/10* (2006.01)

(56) References Cited

U.S. PATENT DOCUMENTS

| | | |
|---|---|---|
| 4,626,853 A | 12/1986 | Lee et al. |
| 4,710,772 A | 12/1987 | Cantwell et al. |
| 4,787,847 A | 11/1988 | Martin et al. |
| 4,949,318 A | 8/1990 | Patrick et al. |
| 5,070,337 A | 12/1991 | Chen et al. |
| 5,532,700 A | 7/1996 | Lockwood |
| 6,432,055 B1 | 8/2002 | Carp et al. |
| 6,473,636 B1 | 10/2002 | Wei et al. |
| 6,950,372 B2 | 9/2005 | Sogaard |
| 7,106,657 B2 | 9/2006 | Sogaard |
| 7,652,952 B2 | 1/2010 | Betts et al. |
| 7,710,825 B2 | 5/2010 | Betts et al. |
| 7,729,302 B2 | 6/2010 | Sandbote |
| 7,755,974 B2 | 7/2010 | Betts et al. |
| 9,470,779 B2 * | 10/2016 | Stokes ................ G01S 7/52001 |
| 10,338,217 B2 * | 7/2019 | Stokes .................... G01S 15/96 |
| 2003/0128554 A1 | 7/2003 | Crewson et al. |
| 2004/0109388 A1 | 6/2004 | Sogaard |
| 2004/0254459 A1 | 12/2004 | Kristoffersen et al. |
| 2005/0007879 A1 | 1/2005 | Nishida |
| 2008/0037371 A1 | 2/2008 | Chang et al. |
| 2008/0080316 A1 | 4/2008 | Inouchi et al. |
| 2010/0097891 A1 | 4/2010 | Cummings |
| 2010/0253458 A1 | 10/2010 | Chen et al. |
| 2011/0002191 A1 | 1/2011 | DeMaio et al. |
| 2011/0007606 A1 | 1/2011 | Curtis |
| 2011/0032801 A1 | 2/2011 | Onishi et al. |
| 2011/0184289 A1 | 7/2011 | Oshiki et al. |
| 2014/0233355 A1 | 8/2014 | Stokes et al. |
| 2014/0286131 A1 * | 9/2014 | Stokes .................... G01S 15/36 367/87 |
| 2015/0294660 A1 | 10/2015 | Stokes et al. |
| 2017/0184719 A1 * | 6/2017 | Stokes .................. G01S 15/108 |
| 2020/0011991 A1 * | 1/2020 | Stokes ................ G01S 7/52001 |

FOREIGN PATENT DOCUMENTS

| | | | |
|---|---|---|---|
| EP | 2189808 | 5/2010 | |
| EP | 2771710 B1 * | 10/2018 | ............ G01S 15/96 |
| JP | 2005045057 | 2/2005 | |
| WO | WO-2012151191 A1 * | 11/2012 | ............... H04B 1/58 |
| WO | WO 2013/063515 | 5/2013 | |
| WO | WO-2013063531 A9 * | 7/2014 | ......... G01S 7/52001 |

* cited by examiner

Shaping Filter Correlation: Correlation (1.1 x Replica Length)

Shaping Filter Correlation: Correlation (1.1 x Replica Length) Reduced Bandwidth Shaping Filter Correlation: Correlation (1.1 x Replica Length) Reduced Bandwidth Shaping Filter Correlation: Correlation (3 x Replica Length With Taper)

| Main Window | Zoom (Pixel) | Zoom (Data) | Section Of Zoom (Data) |

FIG. 27

Noise And Clutter Detection Process  FIG. 34

WIDEBAND SONAR RECEIVER AND SONAR SIGNAL PROCESSING ALGORITHMS

CROSS REFERENCE TO RELATED APPLICATIONS

This application is a continuation of and claims priority to U.S. patent application Ser. No. 15/287,652 filed Oct. 6, 2016 and entitled "WIDEBAND SONAR RECEIVER AND SONAR SIGNAL PROCESSING ALGORITHMS" which is hereby incorporated by reference in its entirety.

U.S. patent application Ser. No. 15/287,652 is a continuation of and claims priority to U.S. patent application Ser. No. 14/261,316 filed Apr. 24, 2014 and entitled "WIDEBAND SONAR RECEIVER AND SONAR SIGNAL PROCESSING ALGORITHMS" which is hereby incorporated by reference in its entirety.

U.S. patent application Ser. No. 14/261,316 is a continuation of International Patent Application No. PCT/US2012/062315 filed Oct. 26, 2012, which claims priority to and the benefit of U.S. Provisional Patent Application No. 61/551,875 filed Oct. 26, 2011, U.S. Provisional Patent Application No. 61/551,890 filed Oct. 26, 2011, and U.S. Provisional Patent Application No. 61/607,435 filed Mar. 6, 2012. The contents of all of the above-noted applications are hereby incorporated by reference in their entirety.

TECHNICAL FIELD

The present invention relates generally to sonar, and more particularly a wideband sonar receiver and to sonar signal processing algorithms.

BACKGROUND

Producing frequency-modulated sonar systems for commercial applications such as fish finding routinely faces cost pressures. Thus, advanced signal processing techniques must be implemented in an efficient, cost-effective manner. For example, it is desirable to offer relatively high power, such as 1 kW over a wideband frequency range, such as 25 kHz to 255 kHz. The lower frequencies are desirable for deep water operation whereas the higher frequencies offer better resolution in shallow water operation.

The received signal power varies greatly depending upon what depth of operation for a sonar system. The reflected sonar pulse is relatively strong from shallow targets. In contrast, the reflected sonar pulse is relatively weak from deeper targets due to the greater ranges that the deep water reflected pulse must travel. Thus, a sonar receiver capable of operating in both shallow and deep water must accommodate a wide dynamic range in received pulse power such as 120 dB.

An analog-to-digital converter (ADC) requires 20 bits of resolution to directly capture such a large dynamic range. In that regard, 20 bits of resolution means that the ADC is capable of distinguishing over one million different amplitude levels. Such a high-resolution ADC is costly and thus inappropriate for commercial operation.

The receiver costs are exacerbated for a wideband sonar system. But wideband operation is desirable in that pulse compression techniques such as a chirp pulse provide enhanced range resolution. In that regard, range resolution in sonar systems is a function of the effective pulse length. The shorter the effective pulse, the greater the range resolution. But sonar performance is also dependent upon the achievable signal-to-noise ratio (SNR) for the received sonar pulses. In general, the greater the energy for the transmitted pulses, the greater the SNR is for the resulting received pulses. Achieving higher SNR and shorter pulse lengths are thus at odds with one another—for a sonar system with a given transmit power, the SNR is reduced as the pulse length is reduced. Pulse compression techniques enable sonar systems to achieve finer range resolution without sacrificing SNR. To achieve this goal, the pulses may be frequency modulated across a relatively long pulse extent or length. For example, FIG. 1 shows the time domain signal for a received frequency-modulated pulse 100. If the frequency modulation is linear as shown in FIG. 1, pulse 100 is commonly denoted as a chirp pulse. However, non-linear frequency modulation or phase modulation may also be used to achieve pulse compression.

In a pulse compression sonar system, the sonar receiver correlates a replica pulse 105 with the received pulse 100. The resulting detection peak 110 is much narrower than the original pulse length, thus representing the pulse compression effect. In a chirp embodiment, the effective compressed pulse length T' (as defined by the 3 dB width for detection peak 110) equals $1/\Delta f$, where $\Delta f$ is the frequency difference modulated across pulse 100. So the effective pulse is narrowed but the SNR still corresponds to the original pulse width. Thus pulse compression methods are a popular technique to achieve greater range resolution.

Pulse 100 is unshaped in that it has a constant amplitude across all the frequencies. The correlation of an unshaped pulse with its replica in the sonar receiver produces relatively high amplitude range sidelobes as shown in FIG. 1. To reduce these range sidelobes, it is common to amplitude shape the pulses such as seen for a transmitted pulse 200 and a corresponding replica pulse 205 in FIG. 2. The resulting range sidelobes are lowered as compared to the unshaped case of FIG. 1 but the shaping results in lower transmitted pulse power and thus a lower SNR for the received pulses. Moreover, the reduction in range sidelobes demands a high degree of fidelity between the transmitted signal and the stored replica. The signal distortion due to propagation and reflection thus prohibits a significant improvement in sidelobe levels.

Achieving efficient pulse compression yet also having good SNR is not the only challenge for sonar systems. For example, fish-finding sonar systems must fight a variety of interferences such as background noise or signals from other sonar systems. These interferences complicate the task of distinguishing bottom echoes and mask the desired fish detection. To address interferences such as clutter due to water quality, suspended particles such as zooplankton, and thermocline detection, a standard processing scheme employs time averaging of the detected signal. However, time averaging often has very limited effectiveness against these problems.

Accordingly, there is a need in the art for improved sonar systems that offer frequency agile performance and relatively high power at low cost. In addition, there is a need in the art for improved sonar systems that offer pulse compression and sidelobe suppression at low cost. Finally, there is a need in the art for improved sonar processing techniques.

SUMMARY

In accordance with a first aspect of the disclosure, a wideband sonar receiver is provided that includes: a selectable bandpass filter adapted to filter a received sonar signal to produce a filtered signal; an analog-to-digital converter for converting a version of the filtered signal to provide digitized samples; a digital basebanding and decimation stage adapted to baseband and decimate the digitized samples to produce baseband samples of the received sonar signal; and a correlator adapted to correlate the baseband samples with baseband replica samples to provide a correlated signal.

In accordance with a second aspect of the disclosure, a method of processing a received wideband sonar signal is provided that includes: selecting from a plurality of filter bands based upon a center frequency for the received wideband sonar signal; filtering the received wideband sonar signal using the selected filter band; and applying a time-varying gain to a resulting filtered signal.

In accordance with a third aspect of the disclosure, a sonar system for shaping a received sonar chirp pulse according to a shaped replica pulse is provided that includes: a digital signal processor (DSP) configured to divide a frequency-domain version of the received sonar chirp pulse by a frequency-domain version of the shaped replica pulse (FSRP) to provide a shaping filter response and to multiply the shaping filter response by a conjugate of the FSRP to provide a combined correlation and shaping response, the DSP being further configured to multiply the frequency-domain version with the correlation and shaping response to produce a correlated and shaped signal.

In accordance with a fourth aspect of the disclosure, a method of rejecting sonar interference is provided that includes: detecting echoes corresponding to a series of transmitted sonar pulses, each detected echo being represented by a series of time samples; for each detected echo, comparing a series of time samples to corresponding time samples in a preceding echo and a subsequent echo to determine whether the compared time samples exceed the corresponding time samples by a set limit; and if the compared time samples exceed the corresponding time samples in the preceding and subsequent echoes by the detection threshold, replacing the compared times samples with alternative sample values.

BRIEF DESCRIPTION OF THE DRAWINGS

FIG. 27 shows the sonar display windows of FIG. 26 after application of the sonar processing techniques of FIG. 25.

DETAILED DESCRIPTION

A low-cost wideband sonar system is disclosed that achieves high sensitivity as well as sidelobe suppression. In addition, a variety of advanced sonar signal processing algorithms are disclosed that may be advantageously implemented on such a low-cost yet high performance sonar system. The sonar system will be discussed first followed by a discussion of the sonar signal processing algorithms.

Wideband Sonar System

Figure 1:
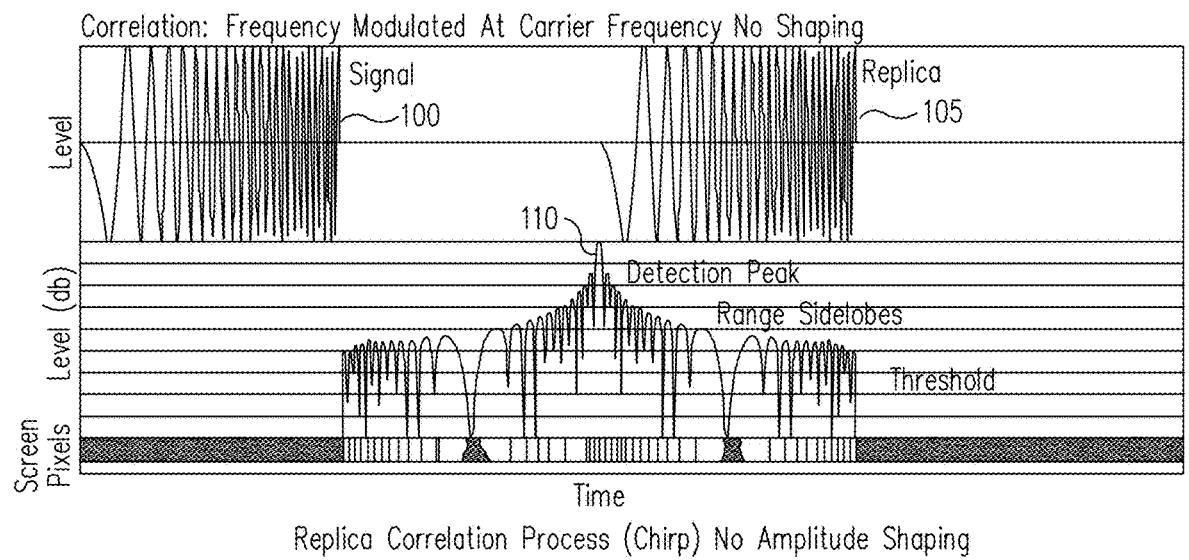
FIG. 1 illustrates an unshaped chirp pulse and its replica as well as their correlation in accordance with an embodiment of the disclosure.
Figure 2:
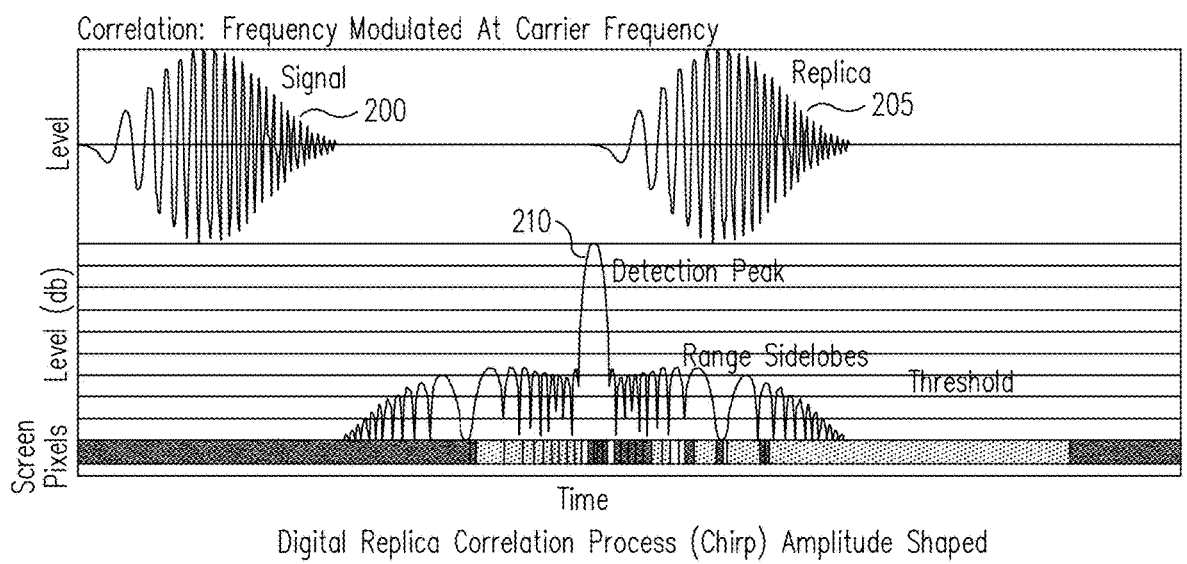
FIG. 2 illustrates a shaped chirp pulse and its replica as well as their correlation in accordance with an embodiment.
Figure 3:
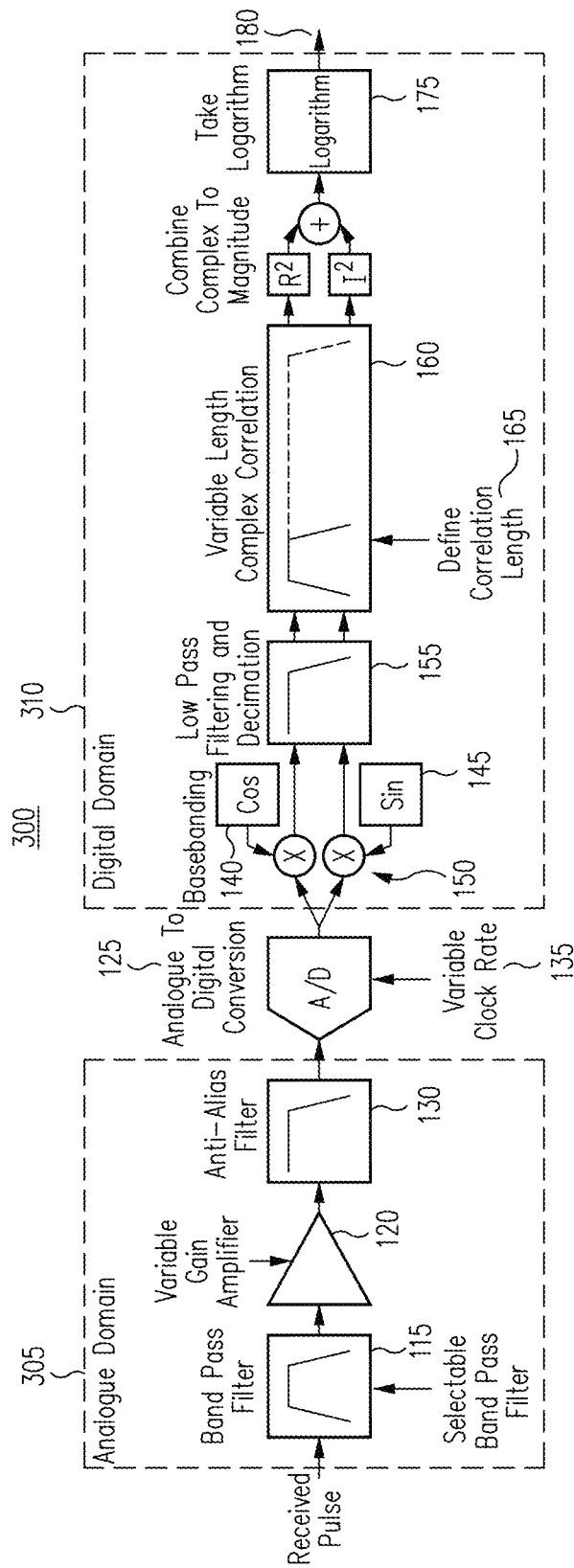
FIG. 3 is a block diagram of a sonar receiver in accordance with an embodiment.

A low-cost wideband sonar receiver is disclosed, in accordance with an embodiment, that achieves high sensitivity at low cost. In reference to the drawings, an example sonar receiver 300 (FIG. 3) includes an analog domain portion 305 and a digital domain portion 310. A transducer (not illustrated) provides an electrical version of a received acoustic sonar signal to a selectable bandpass filter 115. Bandpass filter 115 is controlled so as to select for the different bandpass channels depending upon the desired frequency regime. In contrast, a fixed band pass filter that accommodates the entire wideband available to receiver 300 would let in far too much noise. Moreover, a sonar transducer is amenable to such a selection of various relatively narrow bandpass channels because transducers tend to occupy a fixed number of frequency bands.

Figure 4:
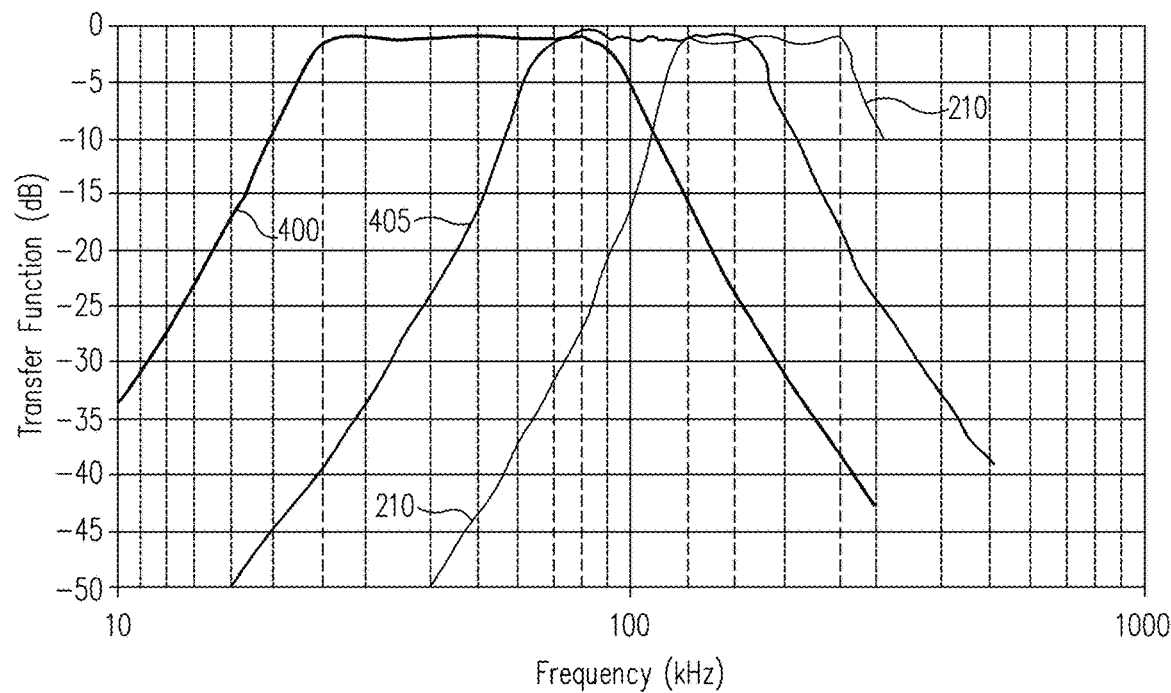
FIG. 4 illustrates the selected bandpass channels for the selectable bandpass filter of the receiver of FIG. 3 in accordance with an embodiment.

In one embodiment, selectable bandpass filter 115 is configured to select from 3 available bandpass channels as shown in FIG. 4. A low-frequency (LF) bandpass 400 extends from approximately 25 KHz to 80 KHz. Similarly, a mid-frequency (MF) bandpass 405 extends from approximately 68 KHz to 160 KHz. Finally, a high-frequency (HF) bandpass 210 extends from approximately 128 KHz to 255 KHz. Although bandpass filter 115 may be constructed using active components, a passive component implementation offers greater dynamic range.

Figure 5:
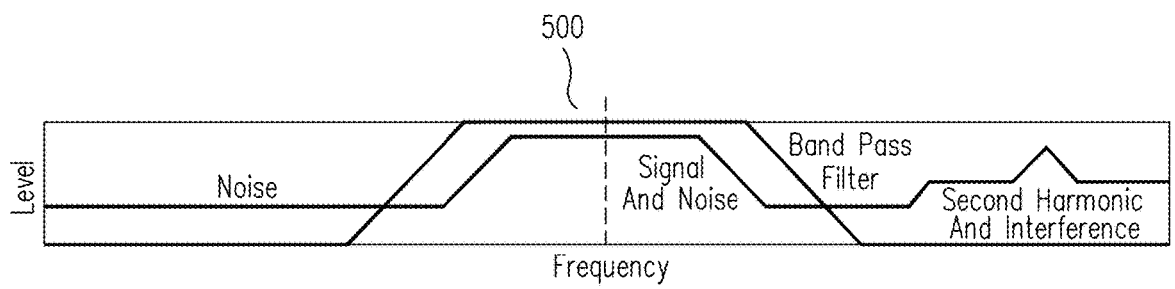
FIG. 5 illustrates a selected bandpass channel filtering the desired signal and rejecting harmonics and interferences outside of the selected bandpass channel in accordance with an embodiment.

In one embodiment, bandpass filter 115 comprises three selectable Chebyshev filters to provide a maximum roll off close to the band edges to obtain the best rejection of interfering signals close to the selected bandpass. For example, FIG. 5 is a frequency domain representation of a selected bandpass filtering for the desired signal and rejecting second harmonics and assorted interferences. The center frequency for the selected bandpass channel is indicated by dashed line 500.

The output of band pass filter 115 is processed by a variable gain amplifier 120. The variable gain amplifier applies an increasing gain as a function of time from a given sonar ping. This gain resets for the next ping Thus, reflected pulses from relatively shallow targets receive lower gains whereas reflected pulses from relatively deeper targets receive higher gain from variable gain amplifier 120. This variable gain thus relaxes the resolution requirements for a downstream analog-to-digital converter (ADC) 125 in that the dynamic range between deep reflections and shallow reflections is flattened because weak signals from deep targets are given higher gain as compared to the gain applied to relatively stronger signals from shallower targets.

Figure 6:
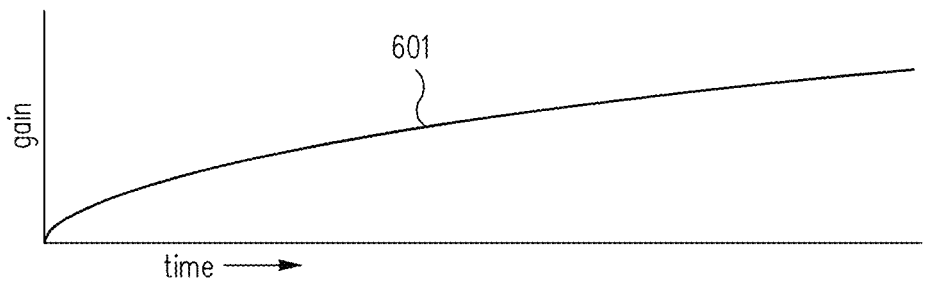
FIG. 6 illustrates the time-varying gain of the variable gain amplifier in the receiver of FIG. 3 in accordance with an embodiment.
Figure 7A:
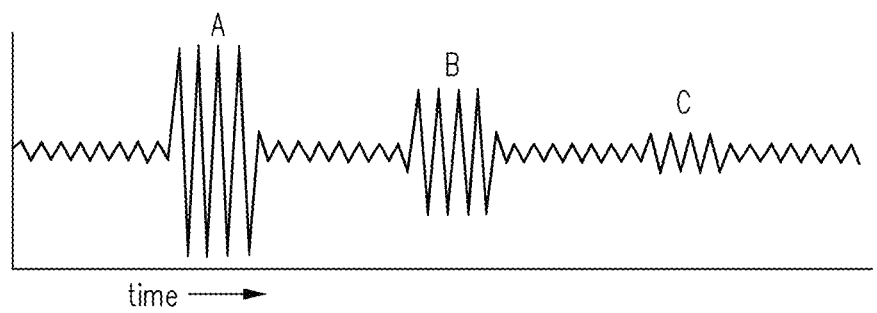
FIG. 7a is a time-domain representation of a series of echo signals from various depths in accordance with an embodiment.
Figure 7B:
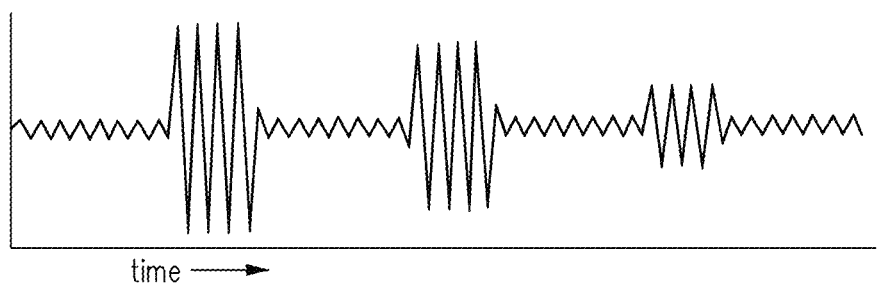
FIG. 7b is a time-domain representation of the echo signals of FIG. 7a after amplification according to the time-varying gain of FIG. 6 in accordance with an embodiment.

FIG. 6 shows an example variable gain curve 601 as a function of time after the most recent ping. The application of this time-varying gain is shown in FIGS. 7a and 7b. FIG. 7a shows the echo return as a function of time from three targets A, B, and C. Target A is relatively shallow and thus its echo is stronger than an echo from mid-depth target B. Similarly, the echo from mid-depth target B is stronger than an echo from a deep target C. Since target A is relatively shallow, its echo is received before the one from B, which in turn is received before the echo from deep target C. Thus, the time-varying gain shown in FIG. 6 will be relatively weak for target A and progressively stronger for targets B and C. FIG. 7b shows the echo responses after application of this time-varying gain. It can be seen that the dynamic range has been reduced, which alleviates the required resolution in ADC 125.

Figure 8:
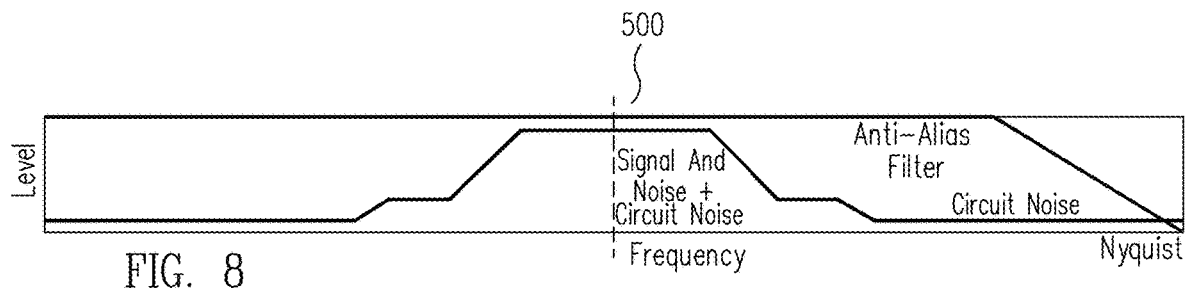
FIG. 8 is a frequency domain representation of the output signal from the variable-gain filter being selected for by the anti-alias filter in accordance with an embodiment.

An anti-alias filter 130 receives the output from variable gain amplifier 120. Despite the selection by bandpass filter 115, which as discussed further below will reject signals that are beyond the Nyquist rate of ADC 125, there is still a likelihood of interfering signals from, for example, adjacent electronic components of the sonar system incorporating receiver 300. Anti-alias filter 130 thus provides additional protection against such unwanted signals. FIG. 8 is a frequency domain representation of the anti-alias cutoff frequency, for anti-alias filter 130, selected for the desired signal, which still contains some unwanted circuit noise.

ADC 125 digitizes the output signal from anti-alias filter 130. This digitization can exploit subharmonic sampling such that a clock rate 135 for the sampling is 4/N times the operating center frequency, where N is an odd integer. In this fashion, the design of ADC 125 may be relaxed in that it can operate at lower sample rates. However, although subharmonic sampling enables a lower clock rate, there is no escaping the Nyquist rate limitations.

In that regard, the spectral content of a signal having bandwidth greater than B/2 cannot be captured without aliasing unless it is sampled according to a rate of B or greater. Thus, suppose ADC 125 is clocked at $4/5*Fc$, where Fc is the center frequency of the signal of interest. Under the Nyquist rate law, all signals having a bandwidth greater than $2/5*Fc$ will be aliased. Thus, a sampling rate of $4/5*Fc$ can only sample signals of bandwidth $2/5*Fc$ or less such that the maximum center frequency for the signal being sampled is $1/5*Fc$. Signals having greater bandwidth will be aliased. Thus, subharmonic sampling is suitable for single frequency sonar systems but may not be suitable for wideband systems employing pulse compression. Moreover, subharmonic sampling may reduce the achievable signal-to-noise ratio as compared to higher sampling rates.

To provide the maximum bandwidth capability, ADC 125 may be clocked so as to oversample such as at a rate of $4*Fc$. This faster rate makes it possible to employ, in one embodiment, a Sigma-Delta-type ADC. Such an ADC has the advantage of providing a digital low pass filter with an extremely fast roll-off rate at the Nyquist frequency, thus reducing the complexity and therefore expense of anti-alias filter 130. In addition, a Sigma-Delta-type ADC achieves higher resolution with relatively lower cost components as compared to conventional ADC architectures. In this fashion, a relatively high dynamic range can be exploited such as a 16-bit resolution for ADC 125. To minimize noise from clock jitter, the transmit and receive processing may be synchronized in the sonar system including receiver 300. In addition, clock 135 may be derived using a direct divide down of an FPGA crystal frequency used in the transmitter (e.g., within a sonar transceiver).

Digital portion 310 of receiver 300 processes the digitized samples from ADC 125. In one embodiment, this digital processing includes basebanding, filtering, and decimation. Basebanding allows the sample rate for ADC 125 to be relaxed, which subsequently reduces the processing load for digital portion 310. In other applications, basebanding is often performed in the analog domain but the processing speed is adequate to perform basebanding in the digital domain for receiver 300. Such digital basebanding in receiver 300 is advantageous because shifting down to baseband in the analog domain often suffers from noise and errors due to DC offsets in the analog circuitry. In contrast, such errors are avoided in receiver 300. Moreover, an analog local oscillator can introduce phase errors between the complex components of its signal whereas receiver 300 will have relatively perfectly synchronized local oscillator components. In addition, analog errors occur due to drift in component values with time or environment whereas receiver 300 is immune to such analog basebanding drift errors.

The basebanding processing principal is as follows: Consider a receive signal s(t) and a complex local oscillator signal r(t), multiply these together to obtain a modulated signal q(t) and filter this to remove the high frequency content and obtain the basebanded signal. A mathematical expression for basebanding follows, with s(t)=A sin(a) and r(t)=cos(b) and j sin(b), where a is the receive signal phase and b is the local oscillator phase. The multiplication of s(t) with r(t) gives:

$$q(t)=A[\sin(a)\cos(b)+j\sin(a)\sin(b)]$$

By trigonometric identities, q(t) is also given as $$q(t)=\{A/2\}[\{\sin(a+b)\}+\sin(a-b)\}+j\{\cos(a-b)-\cos(a+b)\}]$$

Figure 9:
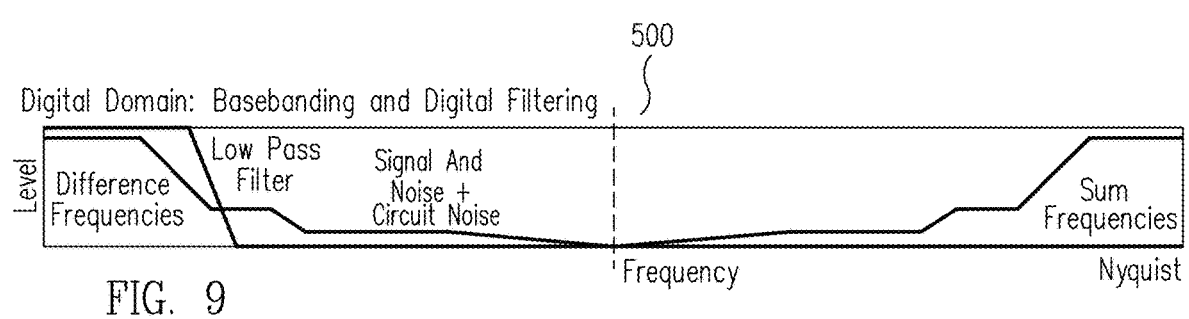
FIG. 9 is a frequency domain representation of the basebanding of the digitized samples in accordance with an embodiment.

After filtering, q(t) becomes $$q(t)=(A/2)[\sin(a-b)+j\cos(a-b)]$$

which is the complex basebanded signal. For a chirp signal centered around the carrier frequency, the phase is given by $$a=2\pi(f_c+(f_r t/2t)-(f_r/2))t$$

where $f_c$ is the center frequency, $f_r$ is the bandwidth, and T is the burst length. If the local oscillator phase b is given by $$b=2\pi f_c t$$

the factor (a−b) becomes $$(a-b)=2\pi((f_r t/2t)-(f_r/2))t$$

which is a chirp signal centered on dc. It will be appreciated, however, that the digital basebanding disclosed herein may be applied to other types of broadband signals. Moreover, the signal need not be centered about the local oscillator frequency and the sampling rate may be adjustable. FIG. 9 illustrates the resulting frequency spectrum for the basebanded signal. The low pass filter that is part of the basebanding process not only removes the high frequency sum components but also removes signals above the down-sampled Nyquist rate to avoid aliasing interference.

Figure 10:
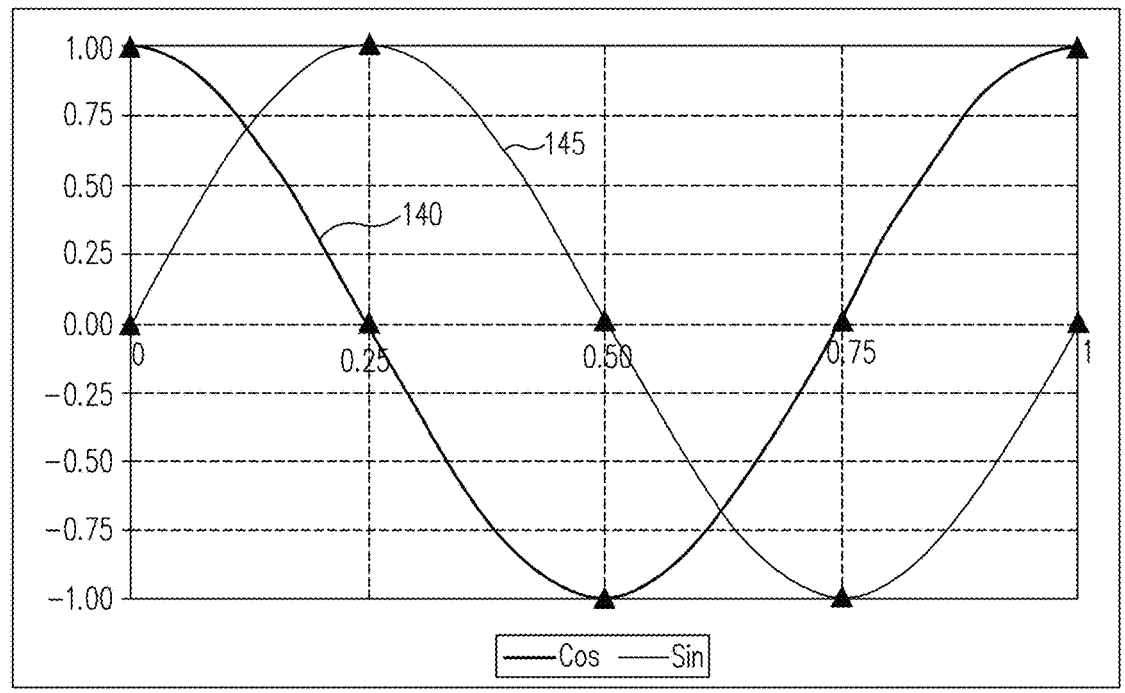
FIG. 10 is a time domain representation of the sin and cosine components of the complex local oscillator for the basebanding process in accordance with an embodiment.

A cosine 140 component and a sin component 145 (FIG. 3 and graphed in FIG. 10) for the complex digital local oscillator signal are digitally multiplied with the digitized samples from ADC 125 in multipliers 150. A particularly advantageous form of components 140 and 145 is achieved when sampling rate 135 is $4*f_c$ (where $f_c$ is the actual center frequency and not the effective center frequency as occurs for slower sampling rates such as $(4/5)*f_c$). At this sampling frequency, components 140 and 145 take only the three values of 1, 0, and −1 as shown in FIG. 10. Cosine component 140 repeats as a sequence {1, 0, −1, 0} whereas sin component 145 repeats as a sequence {0, 1, 0, −1}. In this fashion, no complicated algorithm is necessary for generating sinusoidal signals. Moreover, there is no multiplication necessary with such components such that multipliers 150 are conceptual. Instead, only a sign change operation is necessary to accommodate multiplication by −1. In addition, the repeating zero coefficients introduce a considerable amount of redundancy. The subsequent digital filtering is thus eased as half the data is zero.

A low pass filter 155 selects for the difference components produced by multipliers 150 to complete the basebanding process. In one embodiment, low pass filter 155 comprises a finite impulse response (FIR) filter. A FIR filter is advantageous in that it employs only real coefficients. Thus, the complex multiplications within filter 155 can reduce to just two multiplications rather than four: a complex number (a+jb) times a real coefficient c reduces to ac+jbc. In addition, the FIR coefficients may be selected to be symmetric so that the number of coefficients required to be stored is halved. In turn, the number of FIR multiplications is also halved. The output of filter 155 may be represented as fir in such an embodiment:

$$fir=\sum_{n=1}^{N}s_n c_n$$

$s_n$ = signal sample, $c_n$ = coefficient $c_n = c_1$ $(s_1 c_1 = s_n c_n) = c_1(s_1 + s_n)$ The cos component 140 and sin component 145 alternate so that the resultant I and Q signals also alternate as real only or imaginary only. This alternation of the I and Q components can be exploited to further reduce filter 155 complexity.

Filter 155 also decimates to considerably reduce the number of processes needed to filter the received digital samples from ADC 125. Thus, the number of samples fed to filter 155 may be linked to the desired decimation rate to directly reduce the filter processes according to the decimation rate. Note that filter coefficients and the baseband coefficients can also be combined according to the decimation level to remove a stage in the filter processing (the decimation level should be an integer multiple of 4).

If the sampling rate is $4*f_c$, adjacent samples are in quadrature so that processing can proceed with only the real samples by obtaining the quadrature data selecting an adjacent sample, which is equivalent to shifting the current sample by 90 degrees). However, such a simplification in processing loses 3 dB in signal-to-noise ratio. To avoid that loss, receiver 300 may be implemented with full complex processing. In addition, the processing may be performed entirely in integer form to reduce the processing load.

However, such a simplification will also reduce the signal-to-noise ratio. To maintain simplicity but get better signal-to-noise performance, the filter processing may be performed using integer math but with scaling—at each processing stage, the integer values are allowed to grow but then scaled. Such a scaling technique retains the improved dynamic range of receiver 300 but reduces the bit size to a more manageable level.

As discussed earlier, digital basebanding avoids the error sources associated with analog domain processing. It is highly unlikely for basebanding in the digital domain to introduce spurious signals. In contrast, for basebanding in the analog domain, spurious signals can readily result from nonlinearities, mismatching of frequencies, or component drift. However, digital basebanding can suffer from dc offset when values are truncated, which is necessary if a value exceeds the available bit size. Such truncation introduces a bias that acts effectively as a dc bias and increases noise accordingly. Such truncation will arise at each scaling stage in the integer math implementation discussed above. A solution to this issue is to add 1 to the value just prior to the last shift operation. This effectively adds one-half to the resultant value, which restores the bias level thus removing the dc component. To implement filter 155, an FPGA may be used to accommodate the use of programmable filter coefficients and scaling. Digital component 310 thus comprises an FPGA in one embodiment. A controlling CPU (not illustrated) can thus supply the FPGA with relevant coefficients depending upon the frequency band of operation.

Figure 11:
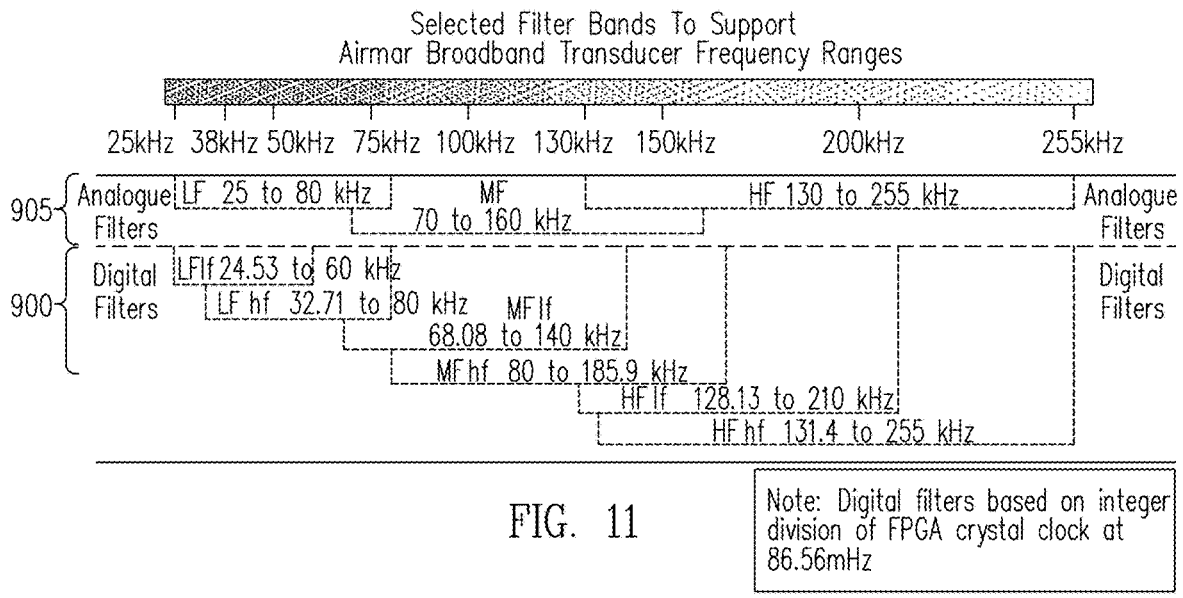
FIG. 11 illustrates low, mid, and high frequency bands of operation for the basebanding digital filter and also for the selectable bandpass filter in the receiver of FIG. 3 in accordance with an embodiment.
Figure 12:
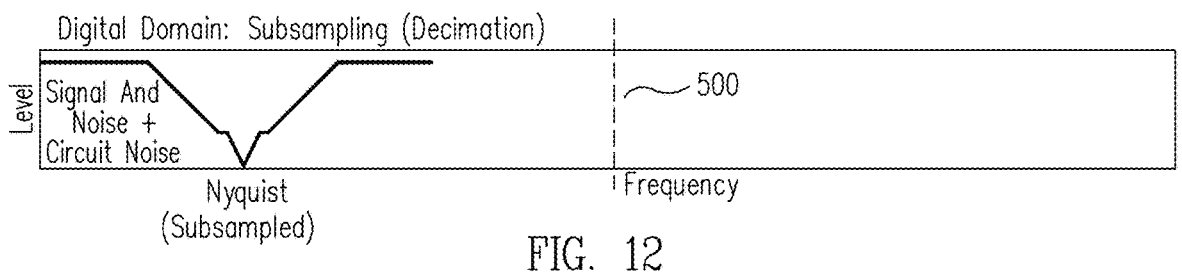
FIG. 12 is a frequency domain representation of the basebanded and decimated signal in accordance with an embodiment.

FIG. 11 shows the resulting FIR filter bands 900 for one embodiment of receiver 300. There are two low frequency bands, two mid frequency bands, and two high frequency bands. In addition, the corresponding low, mid, and high frequency bands 905 for selectable bandpass filter 115 are also illustrated. An example frequency domain representation of the basebanded and decimated signal from filter 155 is shown in FIG. 12.

Figure 13:
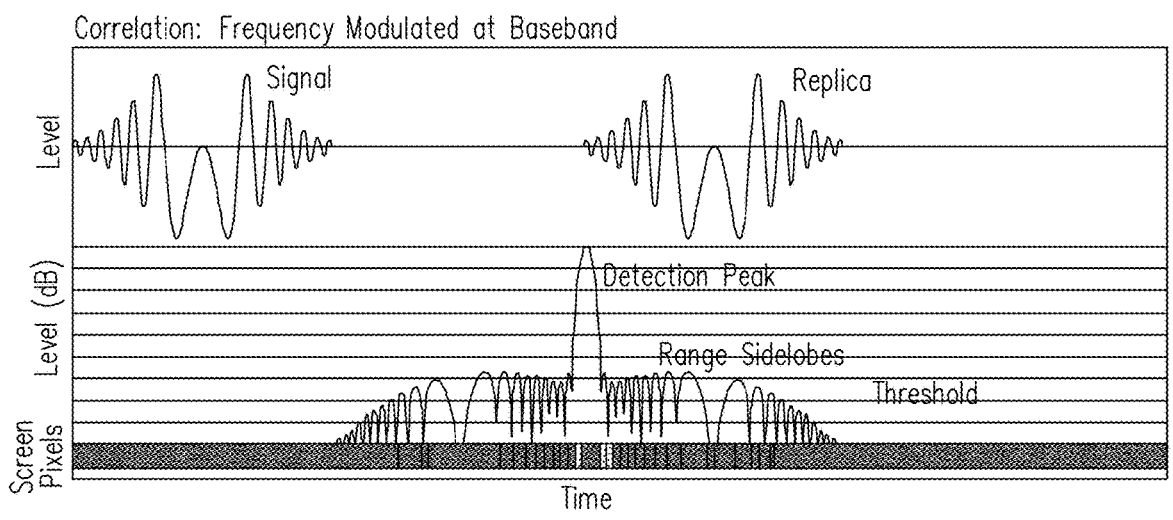
FIG. 13 illustrates the correlation of a symmetric chirp signal and its replica in accordance with an embodiment.

A complex correlator 160 correlates the basebanded and decimated chirp signal from filter 155. Complex correlator 160 may comprise a digital signal processor (DSP). The longer the correlation length for complex correlator 160 (and hence the longer the burst length for the associated sonar system), the better the noise rejection. In contrast, a shorter burst length (and thus a shorter correlation length of complex correlator 160) has the desirable effect of increasing the range resolution for single frequency operation and also reducing the dead time during the transmit burst. Shallow water operation will require shorter burst lengths whereas deeper water operation requires longer burst lengths. To accommodate these conflicting demands, complex correlator 160 may be a variable length complex correlator responsive to a commanded correlation length 165. The variable correlation length corresponds to the variable burst length. The programming of coefficients in a variable complex correlator 160 accommodates the varying burst lengths and frequencies. Since the correlation occurs at baseband, the chirp signal may be implemented to be symmetric about its center as shown in the correlation of FIG. 13. Such symmetry saves on memory resources since the necessary correlation coefficients are reduced by half. Multiplication processing is also halved as $$cor = \sum_{n=1}^{N} s_n c_n$$

-continued $s_n$ = signal sample, $c_n$ = coefficient $c_n = c_1$ $(s_1 c_1 + s_n c_n) = c_1 (s_1 + s_n)$ where cor represents the correlation results. But such symmetry requires that all signals be placed symmetrically around the center frequency, which may not be possible for certain transducer capabilities.

Another method of reducing the correlation overhead is to employ FFT techniques. In that regard, correlation is equivalent to conjugate multiplication in the frequency domain. Thus, converting the basebanded and decimated signal from filter 155 using an FFT reduces the processing to a single set of multiplications rather than a sliding multiply and add as required for a time domain correlation. An IFFT is then applied to the resulting product to obtain the correlation results. An overlap add FFT method can considerably reduce the processing load, but at the expense of requiring more memory resources to store the intermediate stages and at the expense of added complexity. In one embodiment, complex correlator 160 is implemented by programming an FPGA with sufficient memory resources to store the coefficients for the replica signal. The complex correlation can then be implemented directly in the time domain without the need for external memory and associated interface code. For example, if an FPGA implements the digital basebanding process, the same FPGA can implement the complex correlation. In that regard, digital portion 310 may comprise an FPGA as discussed earlier.

With the complex correlation completed, the power of the complex correlation results may be extracted in a complex-to-magnitude stage 170. A logarithm stage 175 may then take the log of the powers to produce a detected echo signal 180. A processor (not illustrated) processes the detected echo signals with, for example, the sonar processing algorithms discussed below. The resulting processed signal may then be displayed such as shown in FIGS. 26-29 as further discussed below.

It is conventional to transmit shaped pulses to achieve better sidelobe suppression. But shaping the pulses lowers the transmitted signal power and thus lowers the SNR for the received pulses. A shaping filter will now be discussed that advantageously achieves shaping upon receipt of unshaped pulses will now be discussed.

The shaping filter is generated in the digital domain to support a high pole count by the use of finite impulse response (FIR) filters (resulting in a pole count that would be impossible to reproduce in the analog domain). Moreover, the digital implementation of the shaping filter enables an on-the-fly calculation of the filter coefficients. Although the shaping filter can be implemented in the time domain, the following discussion will address an embodiment in which the shaping filter is combined with the correlation coefficients in the frequency domain such that shaping filter is applied to the correlation coefficients. The resulting combined coefficients may then be applied to the incoming received pulses. Such a combination of the shaping filter and the correlation coefficients reduces the computation load in that the combined coefficients only need to be calculated once for a particular range setting.

An ideal shaping filter will have an almost infinite extent in the time domain to achieve a perfect match, which is of course impractical to implement. The combined coefficients can be limited to a more realizable extent in time by applying a smooth transition from the length of the original correlation coefficients out to some percentage of this length. For example, in one embodiment, the combined coefficients may be limited to be no more than three times the extent of the original coefficients.

Mathematical Derivation

A derivation for the combined coefficients is as follows. In this analysis, lower case indicates a time domain representation whereas upper case denotes a frequency domain representation. In addition, a convolution is represented by "x," a complex conjugation by "*," a Fourier transform by "F," and an inverse transform by "IF." A received time domain pulse is represented by "s" so that its frequency domain representation is thus given by "S." Similarly, a corresponding time-domain replica pulse is represented by "r" so that its frequency domain representation is given by "R."

As discussed above, the pulse compression correlation is typically performed in the frequency domain as implemented using a Fourier transform:

$$F(s \times r^*) = F(s) \cdot F(r^*) = S \cdot R^* = C \quad (1)$$

where C is the correlation result and "·" represents multiplication. The received signal s contains bursts with varying frequency content that require amplitude shaping prior to replica correlation to reduce the resulting range sidelobes. Advantageously, the following filter coefficients shape the signal burst as a function of the frequency content and position in the burst. The content of the transmitted pulse s is of course known as the sonar system is generating it. Similarly, the replica r is also known as this is the desired transmitted signal with the applied amplitude function (e.g Hamming). Finally, the desired correlation result C is also known as this is the autocorrelation of the replica r. Equation (1) can thus be replaced as follows:

$$C = R \cdot R^* \quad (2)$$

A shaping filter T that can adapt the received signal s to make it resemble the replica r is as follows:

$$R = T \cdot S \quad (3)$$

Equation (3) can be rewritten to solve for T as follows:

$$T = R/S \quad (4)$$

From equations (2) and (3) it follows that:

$$C = T \cdot S \cdot R^* \quad (5)$$

Given the algebraic associativity and commutativity of the correlation process, the filter T and replica R may be combined into a "super replica" denoted as U:

$$U = T \cdot R^* \quad (6)$$

The correlation process C thus becomes $$C = U \cdot S \quad (8)$$

And a time domain version of the super replica filter is $$u = IF(U) \quad (9)$$

The above filtering process can be summarized according to the following steps

1) Convert the replica and the signal into the frequency domain.

2) In the frequency domain, divide the replica by the signal to obtain the shaping filter T.

3) Multiply the shaping filter T by the replica conjugate R* to obtain the super replica U.

4) In the frequency domain, multiply the super filter with the signal or convert the super filter to the time domain and convolve the super filter with the time domain received signal.

To further decrease the computation burden, fast Fourier transform (FFT) techniques may be used to calculate the super filter U. Note that the extent of the super filter in the time domain should be chosen to allow the replica size to increase by an amount considered necessary to support the length of the shaping filter—the replica will increase by the length of the super filter. The time extent of the super filter depends upon a tradeoff between processing load and the desire to achieve the best match to the received signal. In one embodiment, the super filter has an arbitrary maximum size of three times the replica length to achieve a compromise of achieving the best match without excessively overloading the processing. It will be appreciated, however, that achieving a perfect match would require in extreme cases a considerably longer super filter size.

In that regard, the worst case (longest super filter) occurs between an unshaped (rectangular) signal and a harshly shaped replica such as a Blackman-Harris function. Conversely, the best case in terms of super filter time length demands occurs for a correctly shaped signal that already matches its replica and thus would not need shaping. In one embodiment, the length of the super filter is a function of the mismatch between signal and replica to thereby automatically reduce the processing load. Should the super filter be arbitrarily limited in time such as no greater than three times the length of the replica, it is also desirable to apply a smooth transition function at the ends of the time domain super filter to prevent issues with discontinuities at the super filter.

Figure 14:
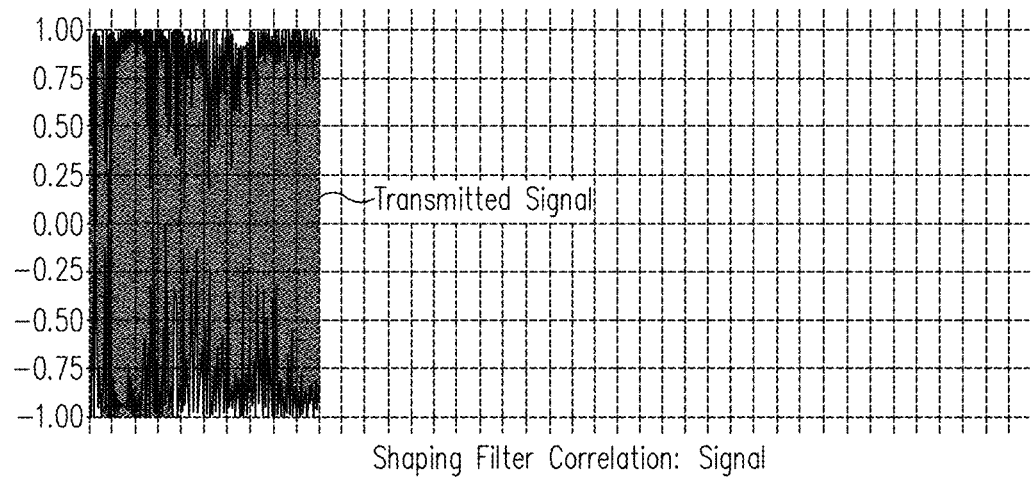
FIG. 14 illustrates an unshaped (rectangular) chirp pulse in accordance with an embodiment.
Figure 15:
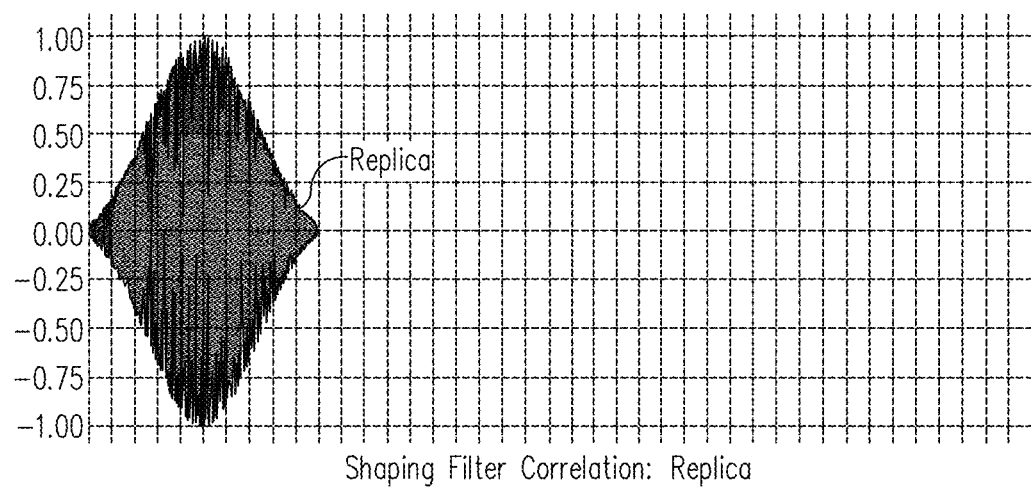
FIG. 15 illustrates a shaped replica of the unshaped pulse of FIG. 14 in accordance with an embodiment.
Figure 16:
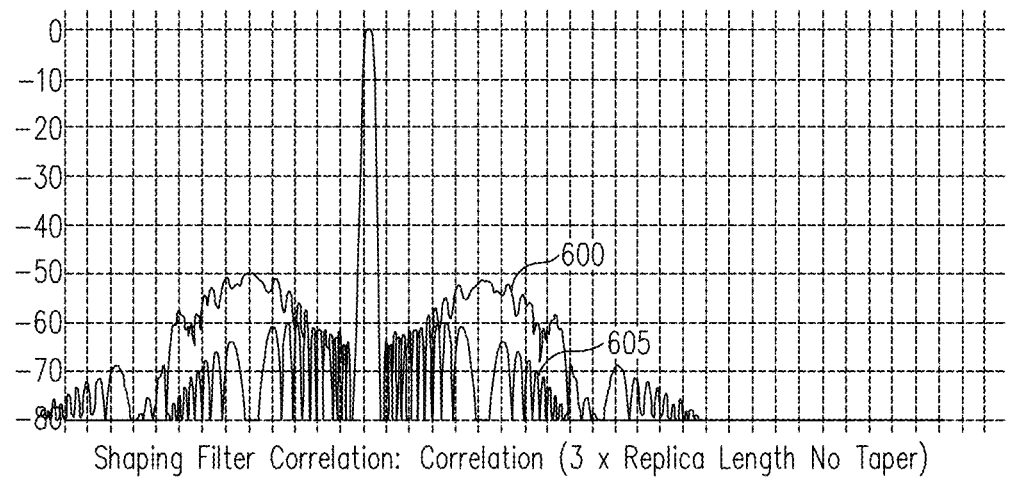
FIG. 16 illustrates a correlation of the unshaped pulse of FIG. 14 with a combined shaping and correlation response having an extent three times greater than the replica pulse of FIG. 14 as well as an ideal autocorrelation of a shaped pulse in accordance with an embodiment.
Figure 17:
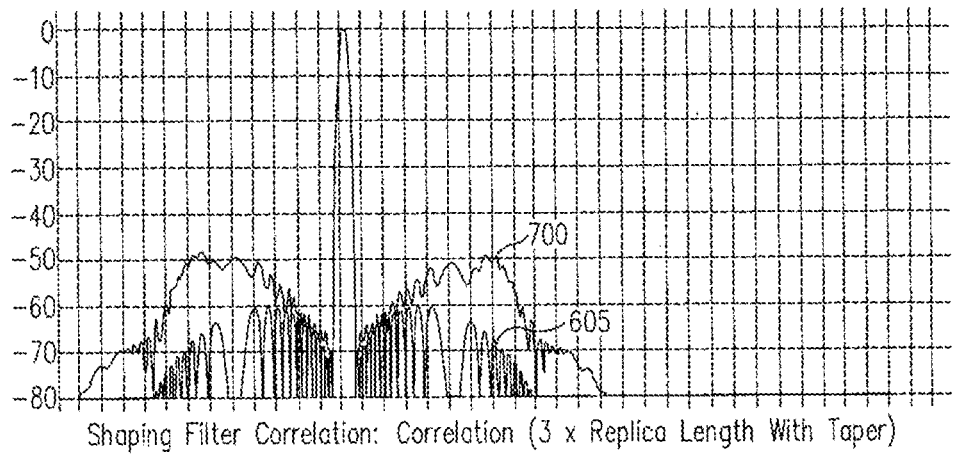
FIG. 17 illustrates a modification of the correlation of FIG. 16 using a taper applied to the ends of the combined shaping and correlation response in accordance with an embodiment.

The advantageous sidelobe suppression of the shaping filter techniques discussed herein may be better appreciated with reference to the following example correlation results between an unshaped (rectangular) signal shown in FIG. 14 and a Kaiser-Bessel-shaped replica signal shown in FIG. 15. FIG. 16 shows a correlation 600 resulting from a super filter of length three times that of the replica and having no taper at the ends. Correlation 600 has relatively high sidelobe levels with a greater spread as compared to the ideal autocorrelation 605 of a shaped pulse. In contrast, better results for the sidelobe spreading can be obtained if a smooth transition function is applied at the ends of the super filter as shown for correlation 700 in FIG. 17 although the maximum sidelobe amplitudes are slightly increased as compared to correlation 600.

Figure 18:
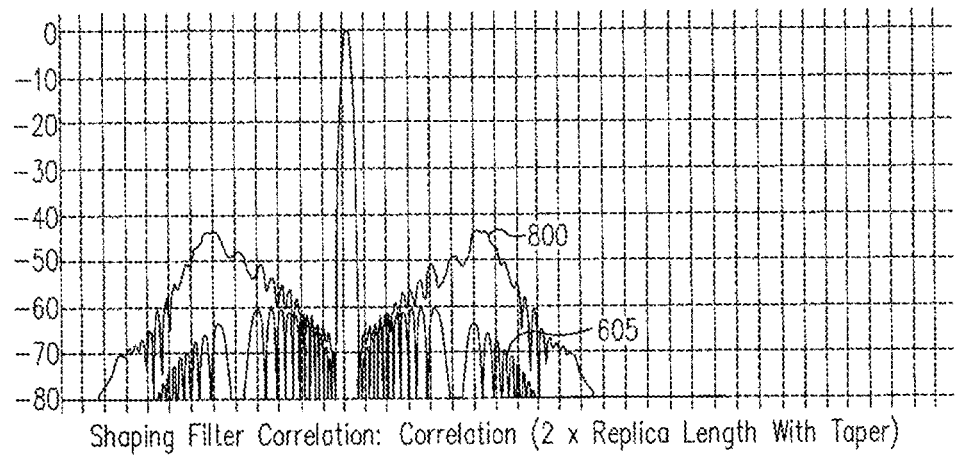
FIG. 18 illustrates a modification of the correlation of FIG. 16 using a taper applied to the ends of the combined shaping and correlation response and also limiting the combined shaping and correlation response to have an extent of no greater than twice the replica pulse in accordance with an embodiment.
Figure 19:
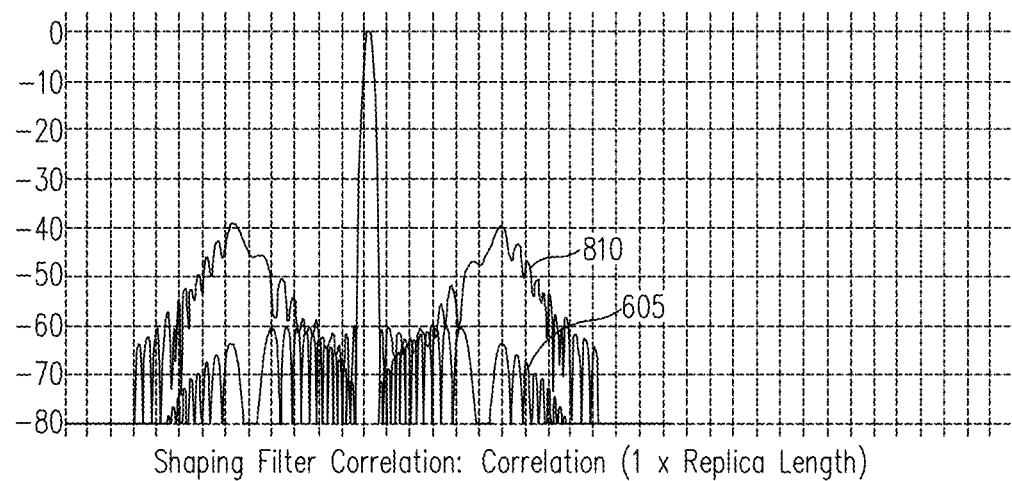
FIG. 19 illustrates a modification of the correlation of FIG. 16 by limiting the combined shaping and correlation response to have an extent of no greater than the replica pulse in accordance with an embodiment.

Similarly, the sidelobe extent can be reduced by reducing the length of the super filter to twice the extent of the replica as shown for correlation 800 in FIG. 18 although the maximum sidelobe amplitudes are considerably increased as compared to correlation 600. The sidelobe extent can be further reduced by reducing the length of the super filter to match the extent of the replica as shown for correlation 810 in FIG. 19. In this case, correlation 810 extends no further than ideal autocorrelation 605 but at the cost of markedly increasing the maximum sidelobe amplitude as compared to correlation 600.

Figure 20:
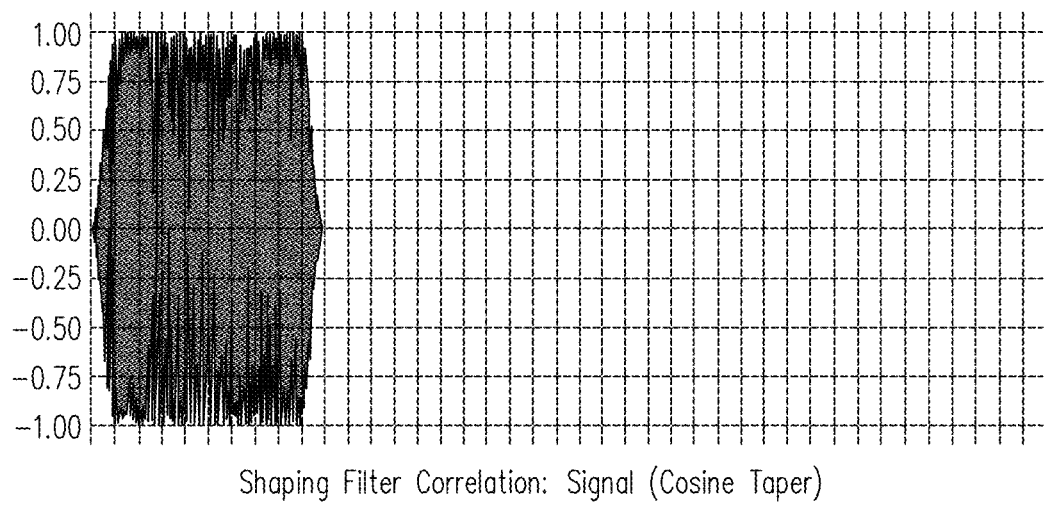
FIG. 20 illustrates a sonar chirp pulse with a cosine taper applied to the ends of the pulse in accordance with an embodiment.
Figure 21:
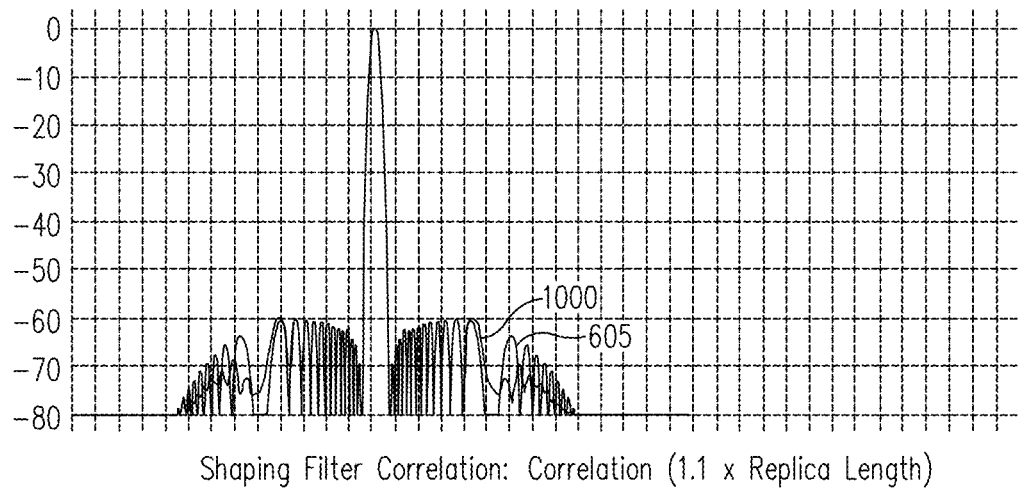
FIG. 21 illustrates a correlation of the shaped pulse of FIG. 20 with a combined shaping and correlation response having an extent 1.1 times greater than a replica pulse well as an ideal autocorrelation of a shaped pulse in accordance with an embodiment.

Should the sonar transmitter be capable of some shaping, performance can be significantly enhanced. For example, FIG. 20 shows a transmitted signal having a cosine taper applied to just 10% of the burst length at either end of the burst. As seen in FIG. 21, the resulting correlation 1000 has maximum sidelobe amplitudes the same or even lower than for autocorrelation 605. Because the super filter is thus only 10% longer than the replica length, the processing load is only increased slightly despite the significant performance improvement.

The super filter is responsive to the frequency content of the transmitted signal so its effectiveness is a function of the bandwidth, with best results at higher bandwidths and no effect for narrowband signals. But this diminishing performance at lower bandwidths is inconsequential in that narrowband signals do not have range sidelobes because the detection peak extends across the full extent of the correlation for such signals. Thus, there is no need to reduce sidelobes for narrowband signals so no improvement in that regard is necessary.

Figure 22:
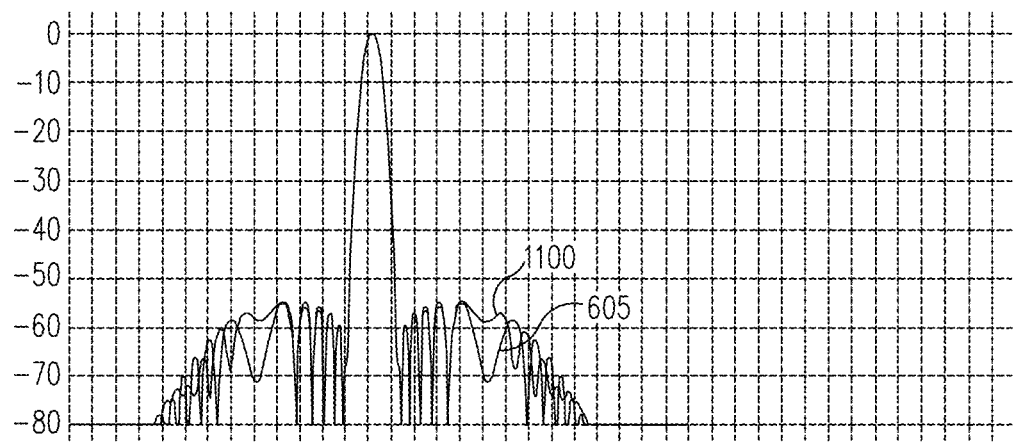
FIG. 22 illustrates a modification of the correlation of FIG. 21 by limiting the shaped pulse to have just one-half the bandwidth extent of the shaped pulse of FIG. 21 in accordance with an embodiment.
Figure 23:
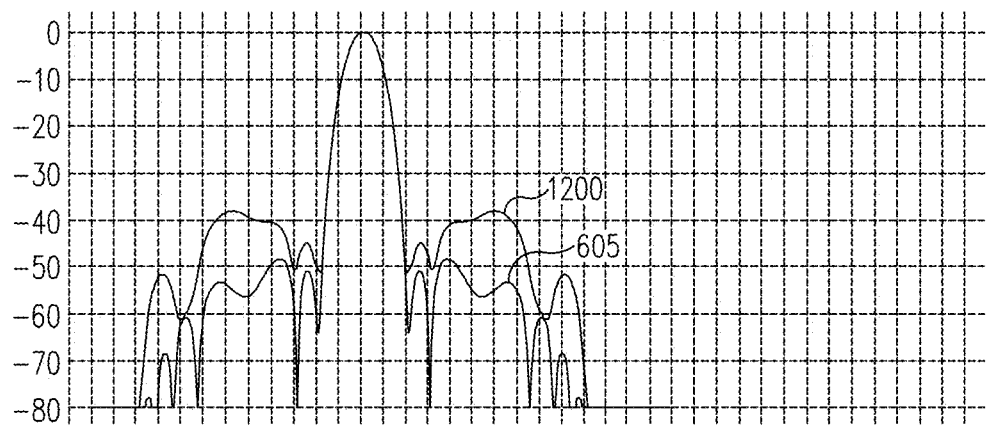
FIG. 23 illustrates a modification of the correlation of FIG. 21 by limiting the shaped pulse to have just one-quarter the bandwidth extent of the shaped pulse of FIG. 21 in accordance with an embodiment.

This bandwidth dependence for the super filter performance is shown in FIG. 22 for correlation 1100 of a transmitted signal having a cosine taper applied to just 10% of the burst length at either end of the burst. Thus, the burst is the same as used for correlation 1000 of FIG. 21 except that it has only one-half the frequency spread with regard to the chirp. Similarly, a correlation 1200 is shown in FIG. 23 for the same transmitted signal except with one-quarter the bandwidth. It can be seen from FIGS. 22 and 23 that the maximum sidelobe amplitude produced by the super filter increases as the bandwidth is reduced.

The filtering discussed herein improves the signal-to-noise ratio (SNR) for a sonar system that would normally used a shaped transmit signal because the effective signal energy level is increased since the transmitter is not shaping the transmitted signal—it is not subject to a reduction due to amplitude shaping. The achieved increase in SNR is a function of the desired range sidelobe levels, i.e. the shaping function imposed upon correlation of the received signal. For a Kaiser-Bessel shaping to achieve −60 dB range sidelobes, the filtering discussed herein increases SNR by 1 to 2 dB. Because SNR is measured on a logarithmic scale, such an increase is actually quite significant in that an increase of just 3 dB represents a doubling of the transmit power. Accordingly, the filtering techniques disclosed herein are quite significant and advantageous.

Figure 24:
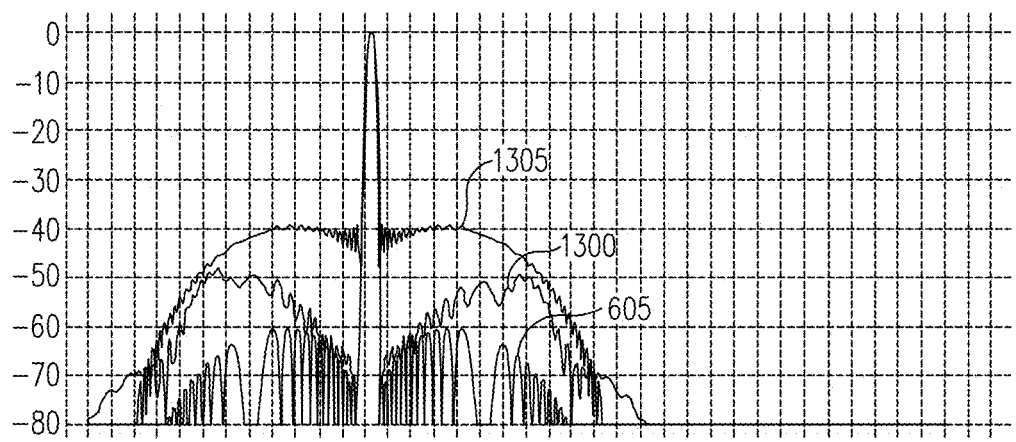
FIG. 24 illustrates a correlation of an unshaped pulse, a correlation of the unshaped pulse with a combined shaping and correlation response, and an ideal autocorrelation of a shaped pulse in accordance with an embodiment.

Another advantage of the disclosed filtering techniques is with regard to the detection of low-level targets in conjunction with a very high-level return from adjacent structure such as a hard bottom surface. The detection of low-level targets requires a large amount of gain but the resulting reflections from the large interfering target would saturate the sonar receiver. The large target increases the range sidelobe levels such that the signal no longer retains its shaping and tends towards the unshaped signal case, as shown for correlation 1305 in FIG. 24. This would obscure the low level target. But the super filter enables the transmission of unshaped signals that are then effectively shaped upon correlation to improve the range side lobe levels.

Should the unshaped signal become saturated in the sonar receiver, the shape and phase is virtually unaffected because the result is a rectangular pulse representation of the sinusoidal signal burst. The rectangular pulse representation is the original signal (the fundamental) with gradually decreasing odd harmonics. The super filter combination will eliminate the harmonics and act on the fundamental in the desired fashion to produce correlation 1300. As compared to correlation 1305, correlation 1300 has significantly reduced sidelobe levels that enable the detection of low-level targets.

Referring back to FIG. 3, the super filter discussed herein may readily be implemented in digital portion 310. As discussed above, the super filter has a variable correlation length depending upon the desired processing load and accuracy tradeoff that is chosen. DSP 160 performs an FFT on the decimated samples from decimator 155 prior to deriving the super filter. DSP 160 then multiplies a frequency-domain version of super filter with a frequency-domain version of the signal samples. DSP 160 also transforms the results of this multiplication back into the time domain using, for example, an inverse FFT operation. A power of the resulting time-domain-super-filtered results may be extracted in a complex-to-magnitude stage 170. A logarithm stage 175 may then take the log of the powers to produce a detected echo signal 180. It will be appreciated that receiver 300 could be modified to perform the super filtering in the time domain using a correlator.

Sonar Signal Processing Algorithms

The frequency agile and low-sidelobe sonar system discussed herein may advantageously apply the following algorithms. However, it will be appreciated that these algorithms may be practiced in conventional sonar systems as well.

Figure 25:
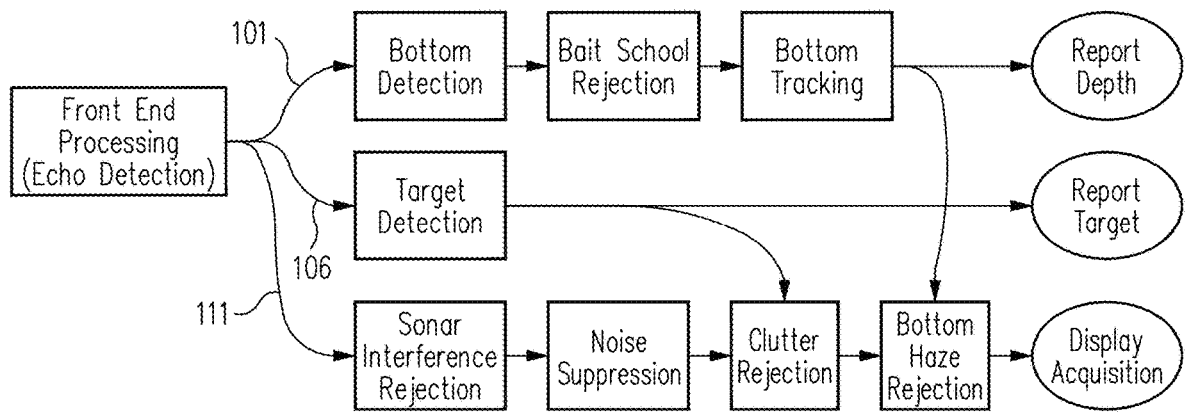
FIG. 25 is a high-level block diagram of sonar processing techniques in accordance with an embodiment.

FIG. 25 is a high-level block diagram of example sonar processing techniques. These techniques are applied to detected echoes from a sonar front-end processing system and may be classified into three main categories: a depth report category 101, a target report category 106, and a display acquisition category 111. Depth report category 101 includes a bottom detection process, a bait school rejection process, and a bottom tracking process. Target report category 106 includes a target detection process. Finally, display acquisition category 111 includes a sonar interference rejection process, a noise suppression process, a clutter rejection process, and a bottom haze rejection process.

Figure 26:
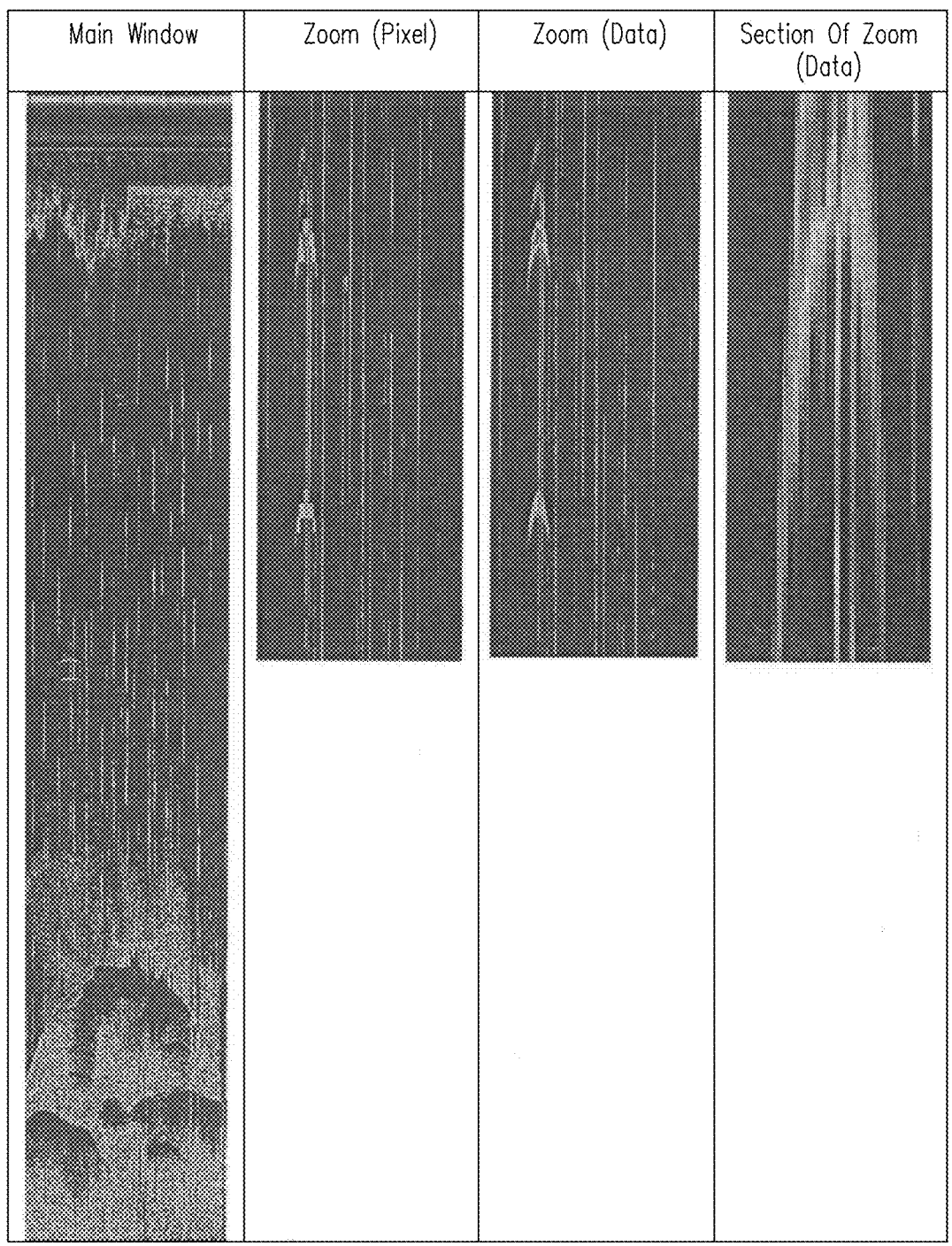
FIG. 26 shows sonar display windows prior to application of the sonar processing techniques of FIG. 25.

These various processes may be better understood with regard to a resulting sonar display prior to these enhancements and after application of the post-processing techniques. FIG. 26 shows a sonar display main window, a sonar zoom window (pixel) using a pixel expansion technique, a zoom window (data) on the same area using the full resolution of the echo data, and a section of the zoom window. FIG. 27 shows the same windows after the processes of FIG. 25 have been applied. Interference from another sonar system operating in the same frequency band and at very high source levels can be seen in the display windows of FIG. 26 as vertical dashes randomly dispersed throughout the window. The processing completely eliminates this interference as can be seen in the same display windows in FIG. 27. Background noise and clutter can be seen in the display windows of FIG. 26 as random lighter speckles that are particularly conspicuous on the zoom plots. The background noise and clutter is significantly reduced after processing as seen in the zoom windows of FIG. 27 with fish targets now standing out more clearly against the background.

Figure 28:
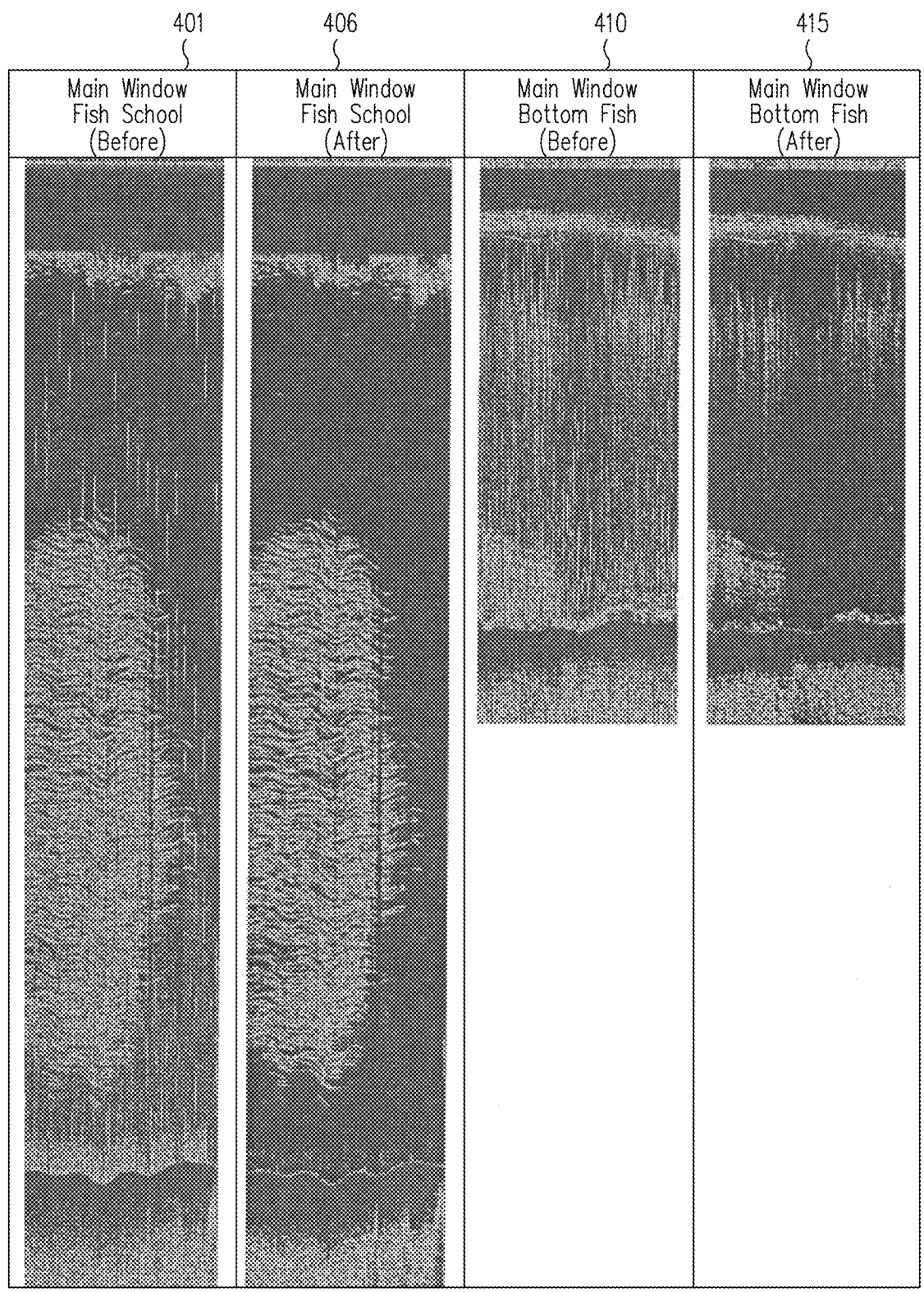
FIG. 28 shows additional sonar display windows before and after the application of the sonar processing techniques of FIG. 25.

The reduction in sonar interference and background noise and clutter is also illustrated in FIG. 28, which shows display windows before and after processing. The post-processing display windows of FIG. 28 also show application of the bottom detection and enhancement algorithm. A left hand pair of plots 401 and 406 show a fish school. Plot 401 demonstrates the effects of haze, which is removed in plot 406. The haze of plot 401, which is most intense immediately above the bottom but spreads into the water column to approximately halfway up the fish school, is suppressed in plot 406 producing a more definite bottom and more prominent fish targets in the lower half of the school. A right hand pair of plots 410 and 415 show the effect of fish targets close to the bottom. These fish targets are shown more clearly in plot 415 after processing and without losing intensity.

The specific processing techniques will now be addressed in more detail, starting with a discussion of the sonar interference rejection process.

Sonar Interference Rejection

Interference from other sonar systems will be due to pick up, either electrically or acoustically, of a transmit burst at the front end of the receiving sonar system. The sonar interference signals will have a large amplitude, a fixed burst length, and appear randomly throughout the acquisition. Detection and elimination can therefore be conducted by the statistical comparison throughout an acquisition and between adjacent acquisitions to identify sonar interference-like signals.

Recognition of signals as interference is based on the length of time (number of samples) that a large signal level is present in a particular acquisition and the persistency over a number of acquisitions; if the signal does not appear in the same part of subsequent acquisitions then it is assumed to be interference. The detection process may allow for varying lengths of interference time to accommodate varying lengths of bursts from the interfering sonar. The sonar interference rejection algorithm disclosed herein therefore includes parameters for duration within a ping and for various levels of intensity.

Figure 29:
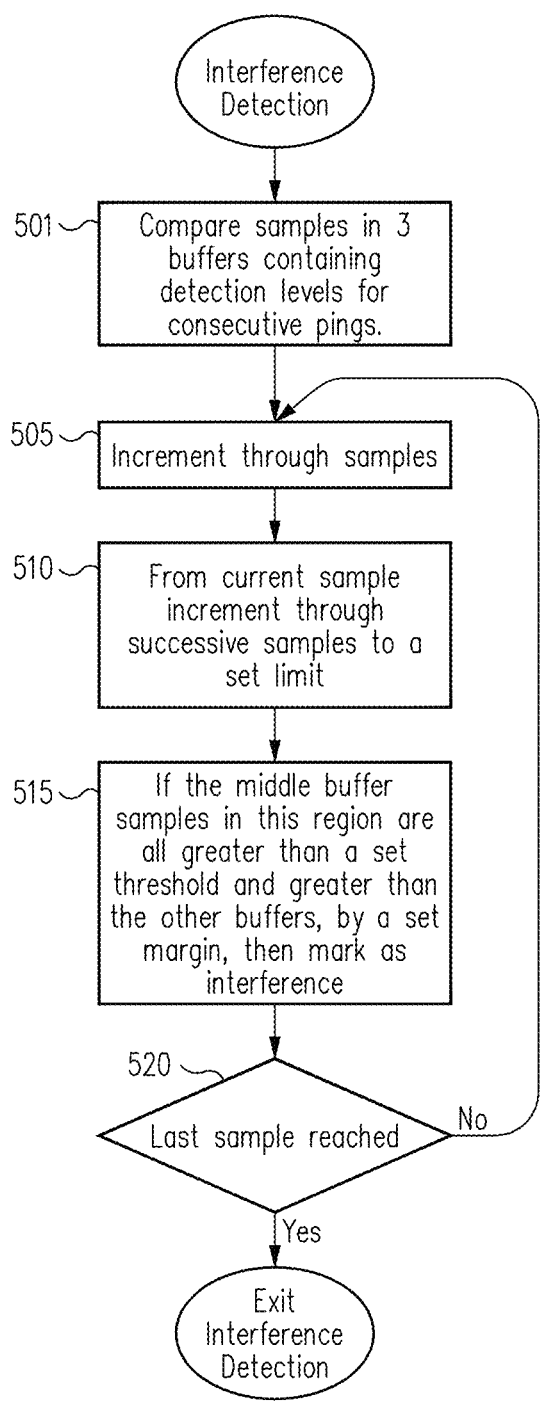
FIG. 29 is a flowchart for a sonar interference detection algorithm in accordance with an embodiment.
Figure 30:
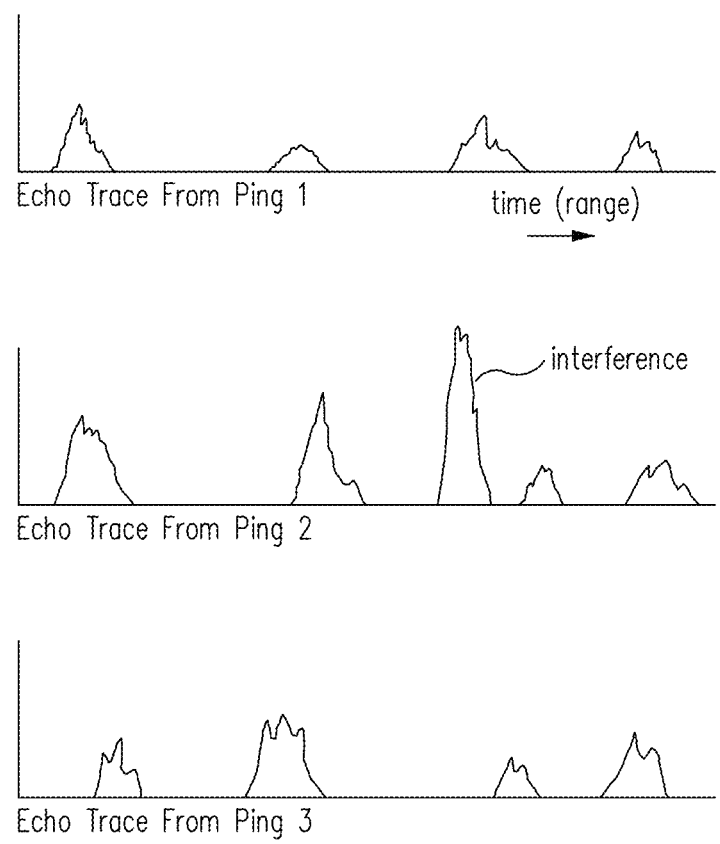
FIG. 30 illustrates three example echoes from three consecutive pings.

A flow chart for the sonar interference rejection algorithm is shown in FIG. 29. In a step 501, 3 consecutive echo traces for 3 corresponding pings are stored in three buffers. Referring back to FIG. 26, recall that sonar interference appears as vertical dashes. In that regard, a display window includes the result of numerous echoes, with each echo trace corresponding to a vertical trace in the display window. Three example echo traces are shown in FIG. 30. An echo trace from ping 2 contains sonar interference whereas the echo traces resulting from a ping 1 and a ping 3 do not. If the echo trace from ping 2 is then incorporated into a display window, the interference indicated in FIG. 30 for this trace will appear as an interfering vertical dash in the resulting display window.

The detection of such an anomalous "dash" for the echo trace for ping 2 is detected as follows. In a step 505, the samples in the middle echo trace (e.g., ping 2 of FIG. 30) are consecutively examined. Note that if a single isolated sample in the middle echo trace had a detection level that was high compared to the same sample time in the adjacent echoes, then that isolated detection may not correspond to a "dash" in the resulting display window. Thus, the sonar interference detection algorithm demands that the detection levels remain high through a set limit of samples past the current sample as determined in a step 510. If all the samples in the set limit are all greater than a set threshold and have amplitudes greater than a set margin as compared to the same time samples in the adjacent echoes, a step 515 marks the samples within the set limit region as sonar interference.

A step 520 determines if there are time samples remaining in the middle buffer. If so, the algorithm loops back to step 505. It will be appreciated that the "set limit" variable of step 510 may be varied depending upon a particular design goal. With the algorithm set to its highest level of sensitivity, step 515 requires only one sample to be classified as interference. In contrast, with the algorithm set to its lowest level of sensitivity, step 515 requires eleven consecutive time samples in the middle trace to be greater than the set margin over the corresponding time samples in the adjacent echo traces to classify the set limit region as sonar interference.

Figure 31:
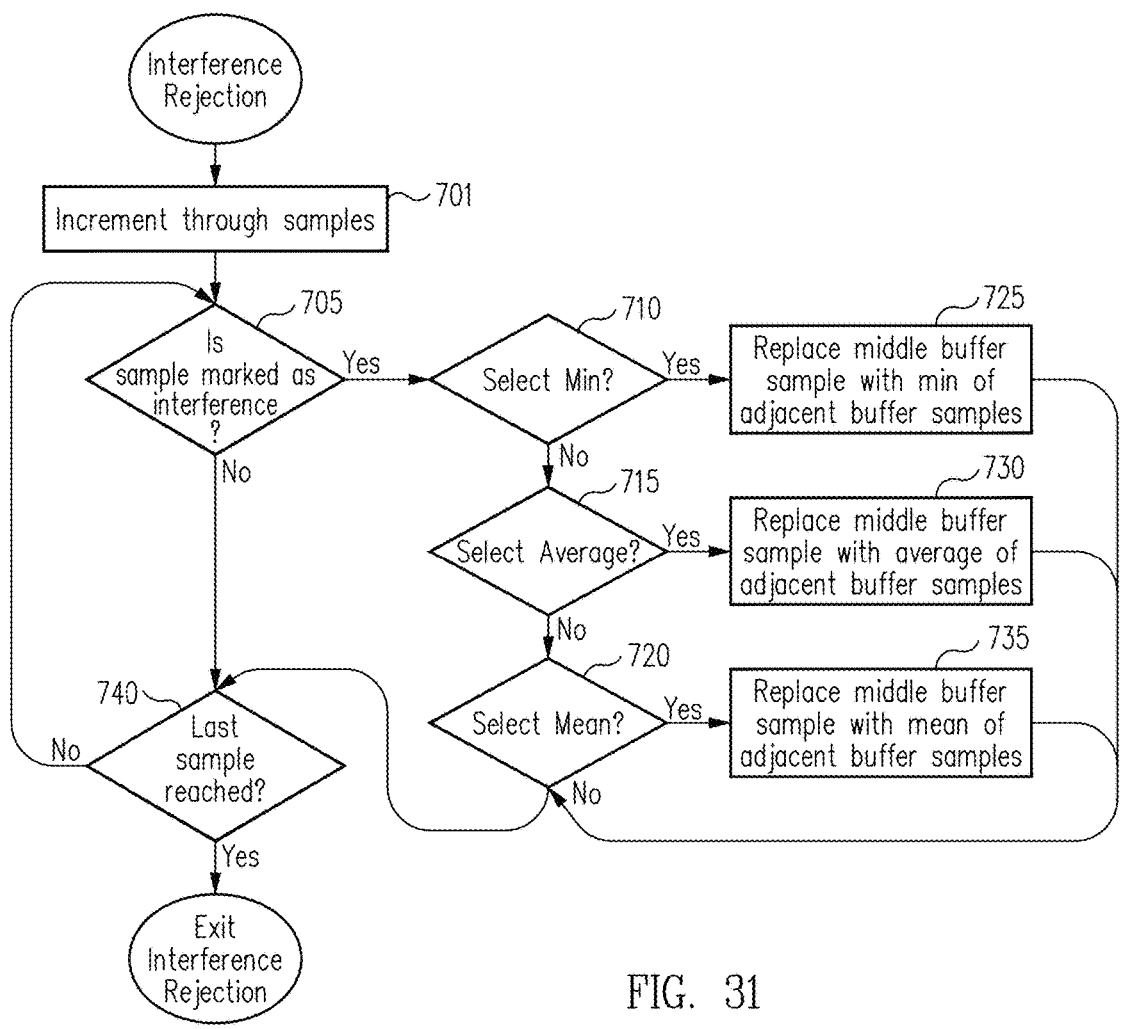
FIG. 31 is a sonar interference rejection algorithm in accordance with an embodiment.

Once detected, the interference must be rejected in such a way that is not conspicuous on the display. This is achieved by replacing the data with samples from adjacent acquisitions, which is successful if the signals in the area of interference do not change significantly between acquisitions. This is the case for data that lies in mid water, or for larger targets such as the bottom return. The replacement algorithm, which exchanges the samples in the acquisition corresponding to the interference with samples from adjacent acquisitions, is illustrated in FIG. 31. The algorithm begins by incrementing through the samples in a step 701. A step 705 tests for whether the current sample is marked as interference as determined with regard to the method of FIG. 29. If so there are, for example, three different replacement alternatives.

Steps 710, 715, and 720 test for whether a given replacement alternative is being asserted. Should step 710 be true, the current sample is replaced with the minimum of the same time samples in the adjacent buffers in a step 725. Similarly, if step 715 is true, the current sample is replaced with an average of the same time samples in the adjacent buffers in a step 730. Finally, if step 720 is true, the current sample is replaced with a mean of the same time samples in the adjacent buffers in a step 735. A step 740 tests for whether all samples have been checked. If there are remaining samples, the replacement algorithm continues by repeating step 705.

The select min method performed in step 725 has a bias towards lower levels and works well with areas in the acquisitions corresponding to back ground noise. Conversely, the select average method performed in step 730 tends to smooth out the data so it works better in situations with gradual changes in the data, such as fish like targets and large singular objects. The select mean method performed in step 735 (mean in this method is defined as halfway between the maximum and minimum values) will have less smoothing than the average method and is better suited to fast changing environments.

Target Detection

Figure 32:
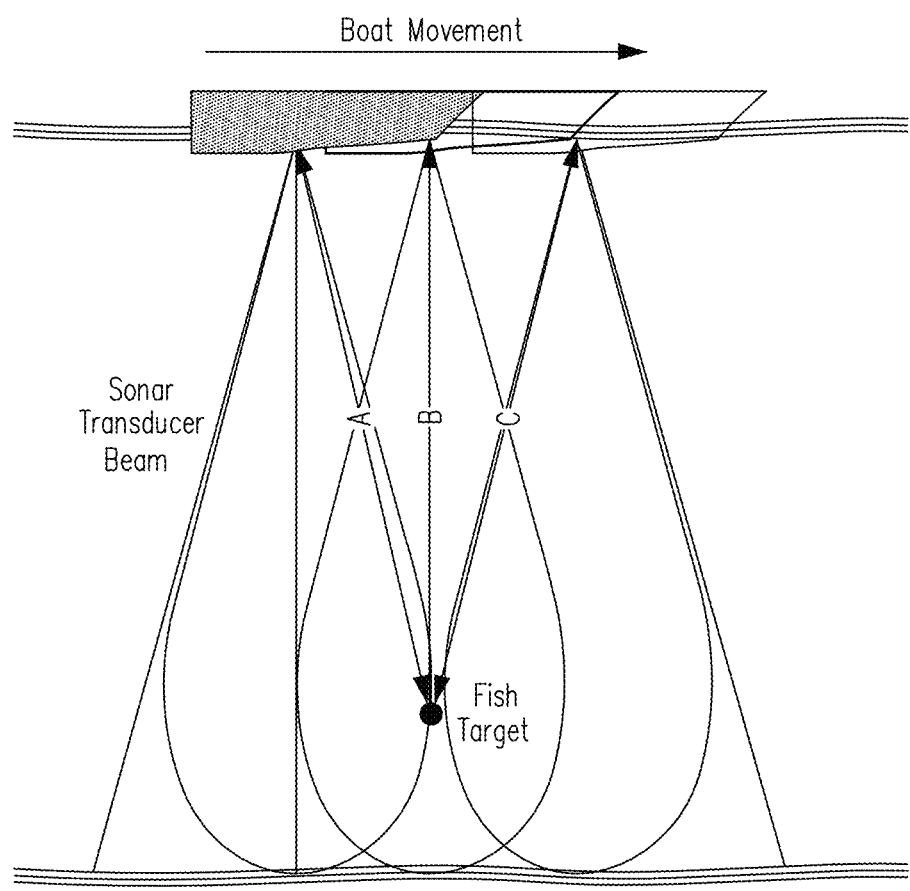
FIG. 32 illustrates several sonar pings with regard to a moving boat and a fish detection.

This algorithm is aimed at identifying fish-like targets, which appear as arches on the display as can be seen in the zoomed data in FIG. 27, where there are 2 prominent fish targets and at least 2 less-discernible targets. The arch is generated by the geometry and sonar transducer beam as shown in FIG. 32. Consider a single fixed point of reflection in the water (typical of a fish swim bladder) and a boat travelling over this point. The first ping that results in a detectable return will be at the edge of the sonar beam and at a range indicated by path "A." As the boat moves over the target the intensity increases as the target enters the more sensitive area of the sonar beam and the range decreases due to the geometry. The maximum signal and minimum range will be when the boat is directly over the target as indicated by path "B." The reverse happens as the boat continues over the target with range and intensity decreasing as indicated by path "C." Conversely the bottom return is constant as the range and beam intensity remain constant with boat movement, which is typical of larger non-fish like targets. General interference and noise will have random range and intensity levels.

Figure 33:
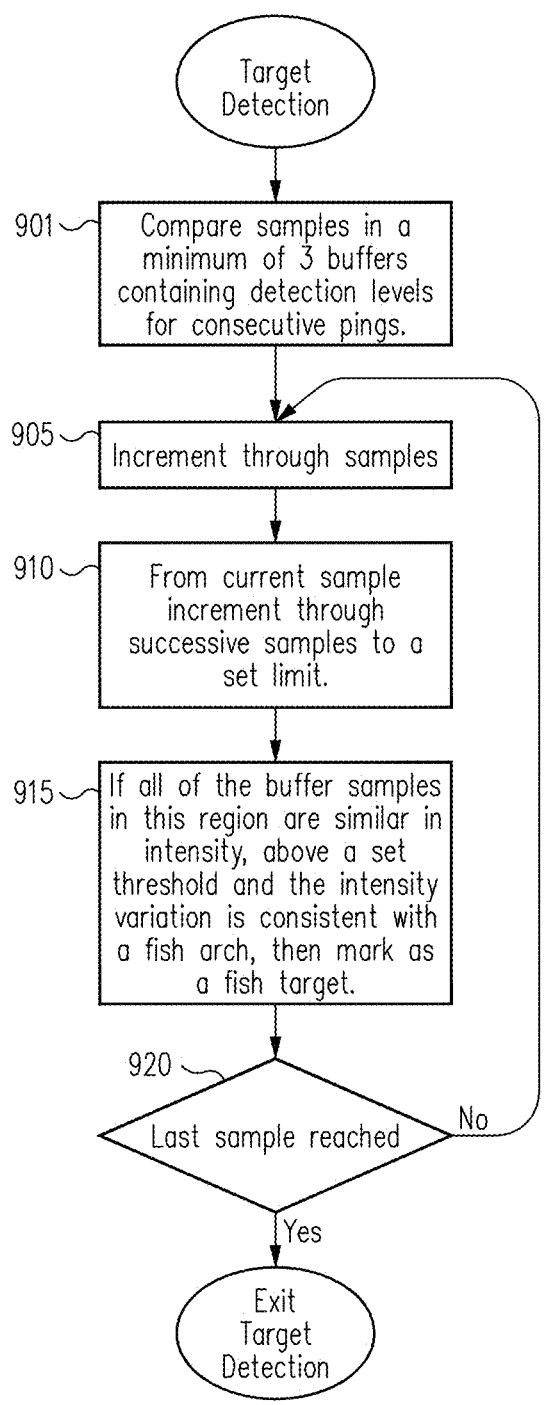
FIG. 33 is a flowchart for a fish detection process in accordance with an embodiment.

The process of detection and discrimination against non-fish targets can be achieved by statistical comparison between adjacent acquisitions to identify the characteristic trends as described above. Therefore the recognition of signals as targets is based on the persistency over a number of acquisitions, length of time present in a particular acquisition and trend in time between adjacent acquisitions. The algorithm process is as follows and is shown in the flow chart in FIG. 33. A store containing buffers of data for at least 3 consecutive pings are inspected on a sample per sample basis as performed in steps 901 and 906. In a step 910, the method continues by incrementing from the current sample to a set limit. If the buffer samples in this region all have similar intensities above a set limit and are consistent with a fish arch shape and intensity variation then the area is marked as a fish target in a step 915. A step 920 tests for whether all samples have been tested. If samples remain, then the algorithm loops back to step 905. The algorithm supports tailoring for thresholds on fish arch persistence over a number of pings and duration within an acquisition. The algorithm of FIG. 33 is further enhanced in conjunction with pulse compression due to the finer range resolution achieved.

Noise and Clutter Rejection

There are numerous sources of noise and clutter in sonar systems, which manifest as false targets and speckling of the sonar display. The electrical noise will be a combination of general background and circuit noise along with pickup from boat engines. Clutter will be from multiple reflections within the water such as from particulates or bubbles or from surface and bottom boundaries. The net result reduces the ability to discern desirable targets such as fish and structure.

A considerable amount of noise rejection will be achieved through the front end echo detection process, but it is desirable to further enhance the sonar display to reduce unwanted signals. Standard techniques use filtering methods which invariably trade target detail and clarity against noise and clutter levels. Although these methods are retained within the noise rejection algorithm, a much better result can be achieved by first applying the algorithms described herein, where the algorithms identify desirable features thus allowing the ability to enhance targets and deemphasize noise.

Figure 34:
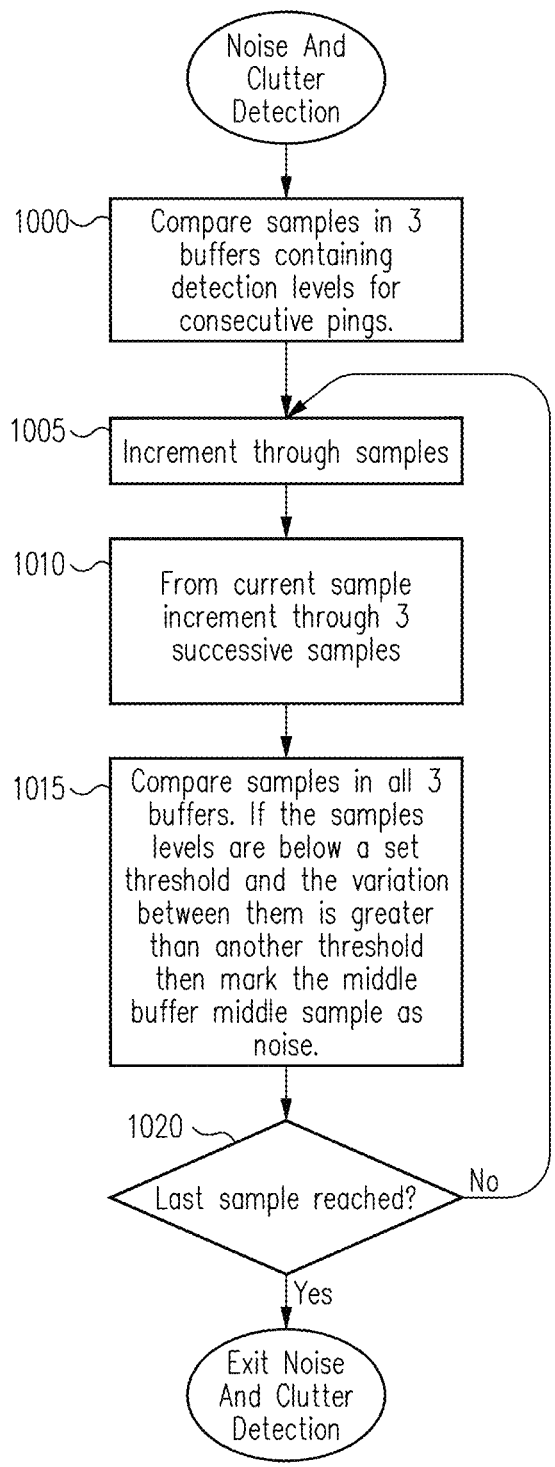
FIG. 34 is a flowchart for a noise and clutter detection algorithm in accordance with an embodiment.

A filtering technique employed after applying the detection algorithms is a novel method of noise and clutter reduction that is conducted using a statistical analysis of adjacent samples within an acquisition and with adjacent samples from subsequent acquisitions. This algorithm combines the detection of noise and clutter and is shown in FIG. 34. The method involves the comparison of a current time sample in the middle buffer with adjacent time samples in the adjacent buffers in a step 1001. The samples in the middle buffer are successively examined in a step 1005. This examination occurs from the current sample though 3 successive samples in a step 1010. If the variation between the samples in all three buffers across these successive samples is greater than a set threshold and all levels are below another threshold level, then the current sample is considered to be noise or clutter in a step 1015. A step 1020 tests for whether all samples have been reached. If samples remain unprocessed, the method loops back to step 1005.

Figure 35:
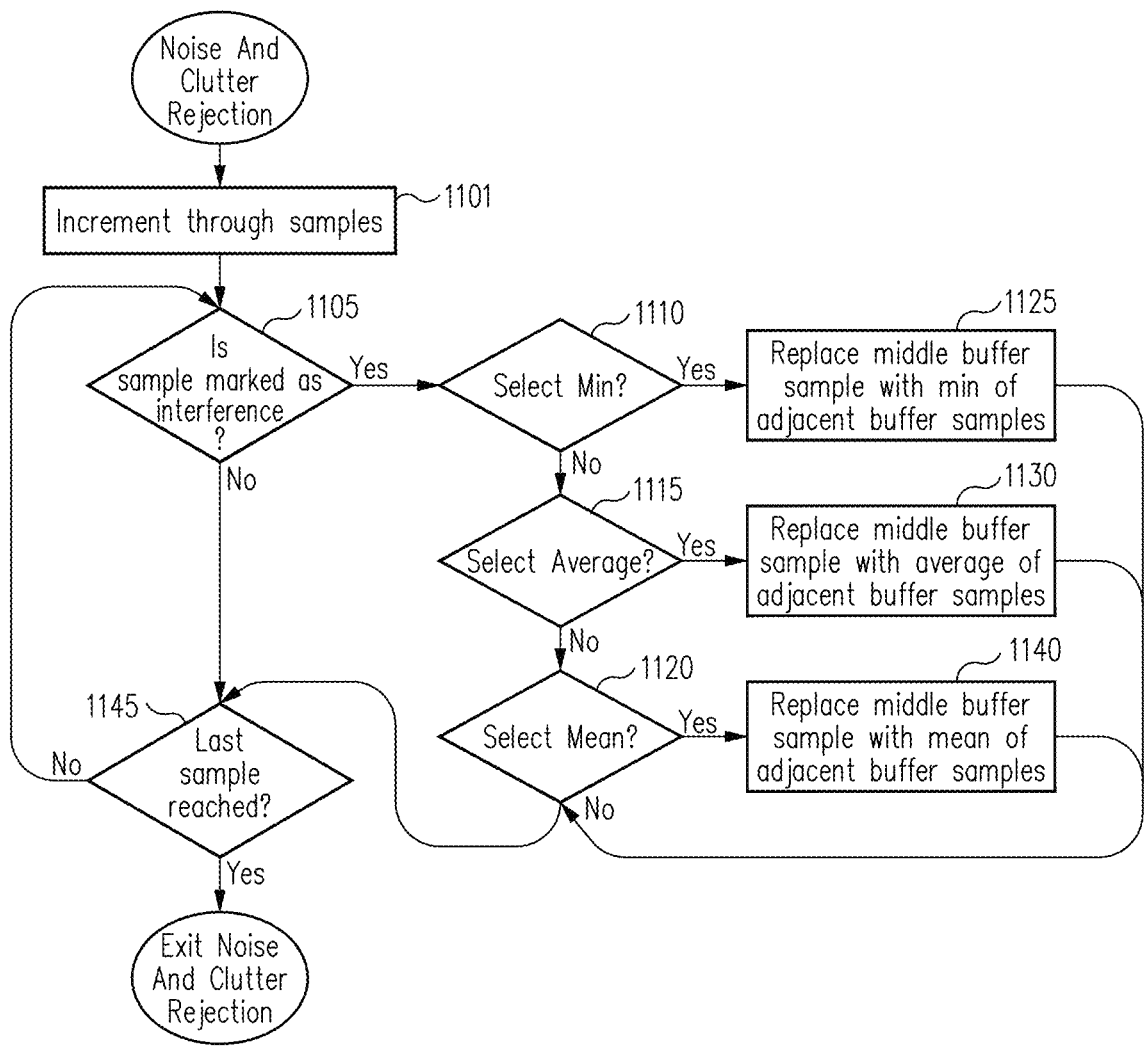
FIG. 35 is a flowchart for a noise and clutter rejection algorithm in accordance with an embodiment.

Should a sample be deemed as noise or clutter, it is replaced according to the algorithm shown in FIG. 35. The method begins by incrementing through the samples in a step 1101. A test for whether a sample is marked as noise/clutter is performed in a step 1105. If step 1105 is true, there are three different replacement alternatives. Steps 1110, 1115, and 1120 test for whether a given replacement alternative is being asserted. Should step 1110 be true, the current sample is replaced with the minimum of the same time samples in the adjacent buffers in a step 1125. Similarly, if step 1115 is true, the current sample is replaced with an average of the same time samples in the adjacent buffers in a step 1130. Finally, if step 1120 is true, the current sample is replaced with a mean of the same time samples in the adjacent buffers in a step 1140. A step 1145 tests for whether all samples have been checked. If there are remaining samples, the replacement algorithm continues by repeating step 1105.

Bait School Rejection

Bait schools are schools of fish that attract larger predator fish such as marlin or tuna. The fisherman will position the boat over a school in order to catch the predator fish, which results in the school remaining stationary below the boat and within the sonar beam. For a tightly packed school, which invariably occurs when predators are patrolling, the echo returns for the individual fish merge creating the impression of a large solid target. With this sitting in the beam at a fairly constant depth, the sounder module will misinterpret the school as bottom and report an incorrect depth. The rejection algorithm must avoid this misinterpretation.

The bait school rejection algorithm relies on statistical analysis of the acquired detection data over a number of pings and is included in the bottom detection algorithm as described further below. The main requirement is that the bait school is more 'broken up' than the bottom return, which is the case for widely spaced fish or when employing pulse compression techniques, which provides better resolution and can distinguish between individual fish within the school. The statistics in this case will favor the true bottom return over the fish school.

Thermocline Rejection

Thermoclines are distinct layers within the water that have temperatures that change more rapidly with depth than water above and below. They are generally created by flow and eddies or by the action of the sun on the upper layers. The acoustic properties of the water are affected by temperature so when layers are created like this the acoustic signal can be reflected at the boundary. As this layer remains with the motion of the boat, the sounder module may misinterpret the thermocline layer as a bottom. In addition, the boundary layers tend to attract zooplankton which again acts as reflectors and diffusers, thus reducing the acoustic signal reaching the bottom and increasing the reflected signal from the boundary.

An automated algorithm to reject thermoclines may analyze the apparent structure of the layer to determine how likely that the echoes are due to thermoclines rather than true bottom returns. This can be enhanced by considering later returns in the acquisition which will either be second echoes (multipath from surface and bottom) or further thermoclines or the actual bottom return. Sometimes this is not physically possible due to the strength of the return from the layer(s) and the corresponding reduction of strength of the bottom echoes, so it is necessary to provide some form of user intervention to identify the true bottom return.

The automated thermocline rejection algorithm relies on statistical analysis of the acquired detection data over a number of pings and is included in the bottom detection algorithm as described further below. The main requirement is that the thermocline is more 'broken up' than the bottom return, which is the case for weak thermocline layers or when employing pulse compression techniques, which provides better resolution and can distinguish between multiple returns. The statistics in this case will favor the true bottom return over the thermocline.

A manual override option allows the user to select a section of the depth that can be eliminated from the bottom detection algorithm, thus removing the possibility of incorrect detection. For safety reasons the algorithm continues to analyze the data in this section and provides the shallowest depth of potential bottom along with the bottom return depth considered to be the true bottom. The sonar system depth warnings are triggered by the shallowest depth, thus avoiding the potential of grounding the boat in the case where the user has incorrectly eliminated the true bottom return from the depth detection algorithm.

Bottom Detection and Tracking

The bottom detection algorithm should distinguish between returns that are from the true bottom and those that exhibit similar characteristics, such as thermoclines or bait schools. The tracking algorithm must maintain lock on to the bottom return once acquired and support fast changing gradients. The bottom detection algorithm searches the acquired detection data for each ping to find returns that match a statistical representation of bottom-like returns. The persistence over a set number of samples of a level that exceeds a set threshold is considered a potential bottom. If the potential bottom persists over a number of pings within a set tolerance of samples, the potential bottom confidence is promoted otherwise the confidence is demoted. Lists of potential bottoms are maintained in a hierarchical manner such that the bottom with the most confidence is stored at the top. Once the probability of the top most element has reached a threshold it is designated as the bottom depth, which is then published onto the system.

Additional enhancements include the provision of a low pass filter applied to the acquisition prior to bottom detection to reject any fast changing phenomena such as bait schools or clutter; the bottom return generally persists over a number of samples so will not get rejected. This can be improve further by exploiting the fine range resolution of pulse compression processing which effectively increases the rate of change of semi-transparent layers such as thermoclines and low density bait schools; effectively increasing the effectiveness of the filter. Another enhancement involves statistical analysis of the change of bottom depth to track the bottom over varied gradients, where the trajectory of the bottom is considered so that fast changing depths are maintained while sudden changes of depth, due to incorrect locking onto a thermocline or bait school, are rejected. Yet another enhancement involves the use of chart data when available to limit the bottom detect algorithm to a set tolerance around the chart depth to reduce misinterpreting thermoclines or bait schools as the bottom. This improves the stability and accuracy of the bottom lock.

Bottom Haze Rejection

Bottom haze is a description of a mechanism where the noise level increases with depth when approaching the bottom. This can be seen in window 401 in FIG. 28 for the fish school example, where there is increased speckling behind the bait school which becomes more severe towards the bottom and with this particular case using pulse compression, extreme in the area immediately above the bottom. Some of this extreme level is due to the range side lobes of the bottom echo return which are a side effect of the pulse compression technique. Much of this noise can be reduced by the algorithms described in the previous sections, but some of the noise will remain particularly for the pulse compression technique. An additional algorithm can be employed that uses the depth detection to apply further suppression in the region above the bottom. This method controls the color gain and noise floor in the vicinity of the detected and tracked bottom.

The color gain and noise floor curves are processes applied to the data before display. The noise floor curve is generated from the statistics of the data to determine the level of noise and is subtracted from the data to reduce the displayed noise. The color gain curve is generated from the statistics of the data to determine the maximum levels which is then applied to autoscale the display.

The haze rejection algorithm manipulates these curves to reduce the interference without detriment to the target definition. The principal is to take the standard curves and lift the noise floor by applying a gradient based on the distance from the bottom depth and compensating for this change by adjusting the color gain to maintain the high signal levels. The noise floor thus increasingly removes more of the lower level signals, removing the haze, and the color gain holds the targets at the same intensity. This can be seen by comparing window 401 to window 406 and also window 410 to window 415 in FIG. 28, where the haze around the bottom is removed and the fish targets remain at the same intensity, becoming more distinct.

The haze rejection algorithm applies a linear (in dB's) gradient to the noise floor starting at zero adjustment at the surface with gradually increasing level toward the bottom; this can be linked to the TVG curve shape. If a bottom detection is available and pulse compression is being used then additional adjustment is applied to the data immediately above the bottom. This takes the form of a curve (in dB's) with zero additional adjustment at a distance from the bottom equal to twice the transmitted burst length, increasing to a maximum at the bottom depth.

Fast Bottom Detect

In many bottom sounder sonar systems the algorithm to automatically detect the bottom must start its search at some arbitrary depth and gradually home in on the actual depth, changing the amount of data required dependant on the depth. This process can take some time, particularly as the maximum depth capability of the modern sounders has increased to depths in excess of 10,000 ft where return times (and hence acquisition times) can be in the region of 4 seconds. The starting point is always a compromise between finding a shallow bottom quickly, where the starting point would need to be shallow, while pinging deep enough to ensure that a deeper bottom depth is insonified so that thermoclines are not mistaken as the bottom. The default is usually to err on the side of caution and ping to deep water first, which will increase the time to achieve a lock.

The fast bottom detect algorithm is a combination of successive approximation fast pings along with the ability to access network information such as chart bottom depth. If the chart depth is available then the algorithm will start at a depth slightly greater and apply the normal bottom detection algorithm. If a previous known depth is available within a set time period, then this will be the starting point. Alternatively the algorithm will conduct a successive approximation approach starting at an arbitrary depth until bottom lock is obtained. The user has the ability to override the process by manually selecting the depth range, which will force the algorithm to consider the selected depth to analyze for potential bottoms. This is particularly useful if the bottom detection has inadvertently selected an incorrect shallow depth as the bottom and has set the range to suit this depth, in which case the real bottom will not be insonified and therefore will not be discovered.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A wideband signal receiver, comprising:
   a digital stage adapted to digitize samples of a received wideband signal to produce filtered samples of the received wideband signal; and
   a correlator adapted to correlate the filtered samples with replica samples to provide a correlated signal, wherein the correlator comprises a digital signal processor (DSP) configured to divide a frequency domain representation of the replica samples (FRS) by a frequency domain representation of the received wideband signal (FS) to provide a first filter response, to multiply a shaping filter response by a conjugate of the FRS to provide a second filter response, and to multiply the second filter response by the FS to provide a third filter response.

2. The wideband signal receiver of claim 1, wherein the digital stage is adapted to baseband and decimate the received wideband signal.

3. The wideband signal receiver of claim 1, further comprising an analog stage adapted to modify the received wideband signal.

4. The wideband signal receiver of claim 3, wherein the analog stage comprises a selectable bandpass filter adapted to filter the received wideband signal to produce a filtered signal.

5. The wideband signal receiver of claim 4, wherein the selectable bandpass filter comprises a plurality of selectable bandpass filter bands.

6. The wideband signal receiver of claim 4, wherein the analog stage further comprises a variable gain amplifier adapted to apply a time-varying gain to the filtered signal from the selectable bandpass filter to produce an amplified filtered signal.

7. The wideband signal receiver of claim 6, wherein the variable gain amplifier applies an increasing gain to the filtered signal as a function of time.

8. The wideband signal receiver of claim 6, wherein the analog stage further comprises an anti-alias filter adapted to filter the amplified filtered signal from the variable gain amplifier.

9. The wideband signal receiver of claim 3, further comprising an analog-to-digital converter for converting an analog output of the analog stage into a digital input for the digital stage.

10. The wideband signal receiver of claim 1, wherein the received wideband signal is a sonar signal.

11. A method of processing a wideband signal, the method comprising:
    converting a received wideband signal into a frequency domain representation of the received wideband signal (FS);
    converting a replica sample of the received wideband signal into a frequency domain representation of the replica sample (FRS);
    in the frequency domain, dividing the FRS by the FS to obtain a first filter response;
    in the frequency domain, multiplying the first filter response by a conjugate of the FRS to obtain a second filter response; and
    in the frequency domain, multiplying the second filter response by the FS to obtain a third filter response.

12. The method of claim 11, further comprising transforming the third filter response into a time domain representation.

13. The method of claim 12, wherein transforming the third filter response into the time domain representation comprises using an inverse fast Fourier transform algorithm.

14. The method of claim 11, further comprising extracting a power of the third filter response and taking the log of the power to product a detected echo signal.

15. The method of claim 11, wherein the received wideband signal comprises a chirp pulse.

16. The method of claim 11, wherein the received wideband signal comprises a frequency-modulated sonar signal.

17. The method of claim 11, further comprising digitizing the received wideband signal to produce digitized samples.

18. A method of processing a wideband signal, the method comprising:
    filtering a received analog signal into a filtered analog signal;
    converting the filtered analog signal into a digital signal; and
    applying a shaping filter to the digital signal in the digital domain to produce a shaped signal, comprising:
        converting the digital signal into a frequency domain representation of the digital signal (FS);
        converting a replica sample of the digital signal into a frequency domain representation of the replica sample (FRS);
        in the frequency domain, dividing the FRS by the FS to obtain a shaping filter response;
        in the frequency domain, multiplying the shaping filter response by a conjugate of the FRS to obtain an intermediate shaping filter response; and
        in the frequency domain, multiplying the intermediate shaping filter response by the FS to obtain the shaped signal.

19. The method of claim 18, wherein filtering the received analog signal comprises:
    filtering the received analog signal using a selectable bandpass filter to produce a filtered signal; and
    applying a time-varying gain to the filtered signal.

20. The method of claim 19, wherein the received analog signal comprises a sonar signal.

* * * * *